(12) United States Patent
Chaudhri et al.

(10) Patent No.: US 10,365,794 B2
(45) Date of Patent: Jul. 30, 2019

(54) SYSTEMS AND METHODS FOR DISPLAYING NOTIFICATIONS RECEIVED FROM MULTIPLE APPLICATIONS

(71) Applicant: Apple Inc., Cupertino, CA (US)

(72) Inventors: Imran Chaudhri, San Francisco, CA (US); Eliza Block, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/348,204

(22) Filed: Nov. 10, 2016

(65) Prior Publication Data

US 2017/0060359 A1    Mar. 2, 2017

Related U.S. Application Data

(63) Continuation of application No. 15/005,945, filed on Jan. 25, 2016, now Pat. No. 9,507,608, which is a
(Continued)

(51) Int. Cl.
*G06F 3/0482* (2013.01)
*H04L 12/58* (2006.01)
(Continued)

(52) U.S. Cl.
CPC .......... *G06F 3/0482* (2013.01); *G06F 3/0485* (2013.01); *G06F 3/0488* (2013.01);
(Continued)

(58) Field of Classification Search
CPC ....... G06F 3/0482; G06F 9/4443; H04L 51/24
See application file for complete search history.

(56) References Cited

U.S. PATENT DOCUMENTS 5,345,552 A    9/1994 Brown
6,323,846 B1   11/2001 Westerman et al.
(Continued)

FOREIGN PATENT DOCUMENTS

CN    1848988 A    10/2006
CN    101981987 A   2/2011
(Continued)

OTHER PUBLICATIONS

Brooke, "LockInfo—Feature Packed Lockscreen Mod", Available at http://www.appleiphoneschool.com/2009/11/02/lockinfo-feature-packed-lockscreen-mod/, Nov. 2, 2009, 11 pages.
(Continued)

*Primary Examiner* — Roland J Casillas
(74) *Attorney, Agent, or Firm* — Dentons US LLP

(57) ABSTRACT

Systems and methods are disclosed for displaying notifications received from multiple applications. In some embodiments, an electronic device can monitor notifications that are received from the multiple applications. Responsive to receiving the notifications, the electronic device can control the manner in which the notifications are displayed while the device is operating in a locked or an unlocked state. In some embodiments, the electronic device can allow users to customize how notifications are to be displayed while the device is in the locked and/or unlocked states.

27 Claims, 21 Drawing Sheets

Related U.S. Application Data continuation of application No. 13/489,415, filed on Jun. 5, 2012, now Pat. No. 9,292,310.

(60) Provisional application No. 61/493,470, filed on Jun. 5, 2011.

(51) Int. Cl.

| | | |
|---|---|---|
| *G06F 3/0484* | (2013.01) | |
| *G06F 3/0485* | (2013.01) | |
| *G06F 3/0488* | (2013.01) | |
| *G06F 3/0481* | (2013.01) | |
| *G06F 9/451* | (2018.01) | |
| *H04W 4/21* | (2018.01) | |

(52) U.S. Cl.
CPC ...... *G06F 3/04817* (2013.01); *G06F 3/04842* (2013.01); *G06F 3/04845* (2013.01); *G06F 3/04883* (2013.01); *G06F 9/451* (2018.02); *H04L 51/24* (2013.01); *H04W 4/21* (2018.02); *G06F 3/04855* (2013.01); *G06F 2203/04803* (2013.01)

(56) References Cited

U.S. PATENT DOCUMENTS

| | | |
|---|---|---|
| 6,570,557 B1 | 5/2003 | Westerman et al. |
| 6,677,932 B1 | 1/2004 | Westerman |
| 7,017,119 B1 | 3/2006 | Johnston et al. |
| 7,280,818 B2 | 10/2007 | Clayton |
| 9,292,310 B2 | 3/2016 | Chaudhri et al. |
| 2002/0015024 A1 | 2/2002 | Westerman et al. |
| 2002/0198906 A1 | 12/2002 | Press |
| 2006/0009243 A1 | 1/2006 | Dahan et al. |
| 2006/0101350 A1 | 5/2006 | Scott |
| 2006/0224985 A1 | 10/2006 | Baek et al. |
| 2008/0094371 A1* | 4/2008 | Forstall ............... G06F 3/04883 345/173 |
| 2008/0153464 A1* | 6/2008 | Morris ................... G06Q 10/10 455/412.2 |
| 2008/0220752 A1 | 9/2008 | Forstall et al. |
| 2008/0301580 A1* | 12/2008 | Hjelmeland Alams ..................... G06Q 10/107 715/808 |
| 2009/0005011 A1 | 1/2009 | Christie et al. |
| 2009/0037093 A1 | 2/2009 | Kurihara et al. |
| 2009/0249247 A1 | 10/2009 | Tseng et al. |
| 2009/0305732 A1 | 12/2009 | Marcellino et al. |
| 2010/0058231 A1 | 3/2010 | Duarte et al. |
| 2010/0103125 A1 | 4/2010 | Kim et al. |
| 2010/0123724 A1 | 5/2010 | Moore et al. |
| 2010/0146235 A1 | 6/2010 | Weber et al. |
| 2010/0146384 A1 | 6/2010 | Peev et al. |
| 2010/0146437 A1 | 6/2010 | Woodcock et al. |
| 2010/0159995 A1 | 6/2010 | Stallings et al. |
| 2010/0227600 A1* | 9/2010 | Vander Veen ........ H04M 19/04 455/418 |
| 2010/0248689 A1 | 9/2010 | Teng et al. |
| 2010/0257490 A1 | 10/2010 | Lyon et al. |
| 2010/0269040 A1 | 10/2010 | Lee |
| 2010/0281409 A1 | 11/2010 | Rainisto et al. |
| 2010/0306705 A1 | 12/2010 | Nilsson |
| 2011/0004845 A1 | 1/2011 | Ciabarra |
| 2011/0047368 A1 | 2/2011 | Sundaramurthy et al. |
| 2011/0103598 A1 | 5/2011 | Fukui et al. |
| 2011/0167383 A1 | 7/2011 | Schuller et al. |
| 2012/0084691 A1 | 4/2012 | Yun |
| 2012/0149342 A1* | 6/2012 | Cohen .................. H04L 12/587 455/412.2 |
| 2012/0204191 A1* | 8/2012 | Shia ...................... G06Q 10/10 719/318 |
| 2016/0154549 A1 | 6/2016 | Chaudhri et al. |

FOREIGN PATENT DOCUMENTS

| | | | | |
|---|---|---|---|---|
| CN | 102075619 A | 5/2011 | | |
| EP | 1662760 A1 | 5/2006 | | |
| EP | 1708464 A2 | 10/2006 | | |
| EP | 2256595 A1 | 12/2010 | | |
| EP | 2306262 A1 | 4/2011 | | |
| JP | 2003-169372 A | 6/2003 | | |
| JP | 2006-172464 A | 6/2006 | | |
| JP | 2006-235957 A | 9/2006 | | |
| JP | 2007-3293 A | 1/2007 | | |
| JP | 2007-304983 A | 11/2007 | | |
| JP | 2008-522262 A | 6/2008 | | |
| JP | 2011-101097 A | 5/2011 | | |
| JP | 2011-516936 A | 5/2011 | | |
| JP | 2012-511282 A | 5/2012 | | |
| JP | 2012-248090 A | 12/2012 | | |
| JP | 2015-171114 A | 9/2015 | | |
| JP | 2016-40716 A | 3/2016 | | |
| KR | 10-2006-0105441 A | 10/2006 | | |
| WO | 2009/097555 A2 | 8/2009 | | |
| WO | WO-2009097555 A2 * | 8/2009 | ........ | H04M 1/72552 |
| WO | WO 2009097555 A2 * | 8/2009 | ........ | H04M 1/72552 |
| WO | 2010/065752 A2 | 6/2010 | | |

OTHER PUBLICATIONS

Corrected Notice of Allowance received for U.S. Appl. No. 15/005,945, dated Oct. 18, 2016, 6 pages.
Decision to Grant received for Japanese Patent Application No. 2014-513804, dated Jul. 31, 2015, 6 pages.
Escallier, Paul, "10 Things Android Does Better Than iPhone OS Android", Gizmodo Blog, Jun. 3, 2010, 6 pages.
Final Office Action received for U.S. Appl. No. 13/489,415, dated Jun. 11, 2014, 34 pages.
International Preliminary Report on Patentability received for PCT Patent Application No. PCT/US2012/040962, dated Dec. 10, 2013, 11 pages.
International Search Report and Written Opinion received for PCT Patent Application No. PCT/US2012/040962, dated Jan. 3, 2013, 15 pages.
Non-Final Office Action received for U.S. Appl. No. 13/489,415, dated Dec. 5, 2013, 25 pages.
Non-Final Office Action received for U.S. Appl. No. 13/489,415, dated Feb. 11, 2015, 30 pages.
Non-Final Office Action received for U.S. Appl. No. 15/005,945, dated May 17, 2016, 9 pages.
Notice of Acceptance received for Australian Patent Application No. 2012268312, dated Feb. 3, 2016, 2 pages.
Notice of Allowance received for Korean Patent Application No. 10-2013-7034852, dated Aug. 24, 2016, 3 pages.
Notice of Allowance received for U.S. Appl. No. 13/489,415, dated Nov. 17, 2015, 12 pages.
Notice of Allowance received for U.S. Appl. No. 13/489,415, dated Oct. 22, 2015, 15 pages.
Notice of Allowance received for U.S. Appl. No. 15/005,945, dated Aug. 12, 2016, 9 pages.
Office Action received for Australian Patent Application No. 2012268312, dated Feb. 16, 2015, 3 pages.
Office Action received for Chinese Patent Application No. 2012800272819, dated Jan. 4, 2016, 9 pages.
Office Action Received for European Patent Application No. 12727053.6, dated Mar. 21, 2016, 6 pages.
Office Action received for Japanese Patent Application No. 2014-513804, dated Nov. 28, 2014, 7 pages.
Office Action received for Korean Patent Application No. 10-2013-7034852, dated Apr. 26, 2016, 6 pages.
Office Action received for Korean Patent Application No. 10-2013-7034852, dated Jul. 30, 2015, 6 pages 6 pages.
Office Action received for Korean Patent Application No. 10-2013-7034852, dated Nov. 19, 2014, 7 pages.
Office Action received for Korean Patent Application No. 10-2015-7037047, dated Mar. 15, 2016, 11 pages.

(56) References Cited

OTHER PUBLICATIONS

Office Action received for Chinese Patent Application No. 201280027281.9, dated Sep. 21, 2016, 12 pages (4 pages of English Translation and 8 pages of Official Copy).
Office Action received for Chinese Patent Application No. 201280027281.9, dated Mar. 2, 2017, 5 Pages (2 pages of English Translation and 3 pages of Official Copy).
Office Action received for Japanese Patent Application No. 2015171114, dated Sep. 5, 2016, 6 pages (3 pages of English Translation and 3 pages of Official Copy).
Office Action received for Korean Patent Application No. 1020157037047, dated Nov. 29, 2016, 10 pages (5 pages of English translation and 5 pages of Official Copy).
"Dell Streak Softbank001DL Manual", Softbank Corp., vol. 2, Mar. 2011, pp. 15, 31 (See Communication under 37 CFR § 1.98(a) (3)).
Notice of Allowance received for Chinese Patent Application No. 2012800272819, dated Jun. 13, 2017, 4 pages (2 pages of English Translation and 2 pages of Official Copy).
Office Action received for Japanese Patent Application No. 2015-171114, dated May 19, 2017, 11 Pages (6 pages of English Translation and 5 pages of Official Copy).
Office Action received for Korean Patent Application No. 10-2015-7007065, dated Aug. 21, 2017, 5 pages (2 pages of English Translation and 3 pages of Official Copy).
Office Action received for Australian Patent Application No. 2016203250, dated May 26, 2017, 2 pages.
Notice of Allowance received for Korean Patent Application No. 10-2015-7037047, dated Oct. 30, 2017, 3 pages (Official Copy only) {See attached Communication 37 CFR § 1.98(a) (3)}.
Office Action received for Japanese Patent Application No. 2015-171114, dated Dec. 22, 2017, 16 pages (8 pages of English Translation and 8 pages of Official copy).
Saitou, Kazuo, "Web Site Expert", vol. 32, Published on Oct. 25, 2010, 8 pages (Official Copy Only) (See Communication under 37 CFR § 1.98(a) (3).
Notice of Acceptance received for Australian Patent Application No. 2016203250, dated Mar. 15, 2018, 3 pages.
Office Action received for Korean Patent Application No. 10-2015-7007065, dated Feb. 28, 2018, 8 pages (4 page of English Translation and 4 pages of Official Copy).
Office Action received for Japanese Patent Application No. 2015-171114, dated May 22, 2018, 11 pages (6 pages of English Translation and 5 Pages of Official Copy).
Office Action Received for European Patent Application No. 12727053.6, dated Jul. 4, 2018, 5 pages.
Office Action received for Korean Patent Application No. 10-2015-7007065, dated Dec. 24, 2018, 9 pages (4 pages of English Translation and 5 pages of Official Copy).
Notice of Allowance received for Japanese Patent Application No. 2015171114, dated Mar. 1, 2019, 3 pages (1 page of English Translation and 2 pages of Official Copy).
Office Action received for Japanese Patent Application No. 2018-071908, dated Jan. 28, 2019, 11 pages (5 pages of English Translation and 6 pages of Official Copy).
Office Action received for Australian Patent Application No. 2018204028, dated Apr. 17, 2019, 2 pages.

\* cited by examiner

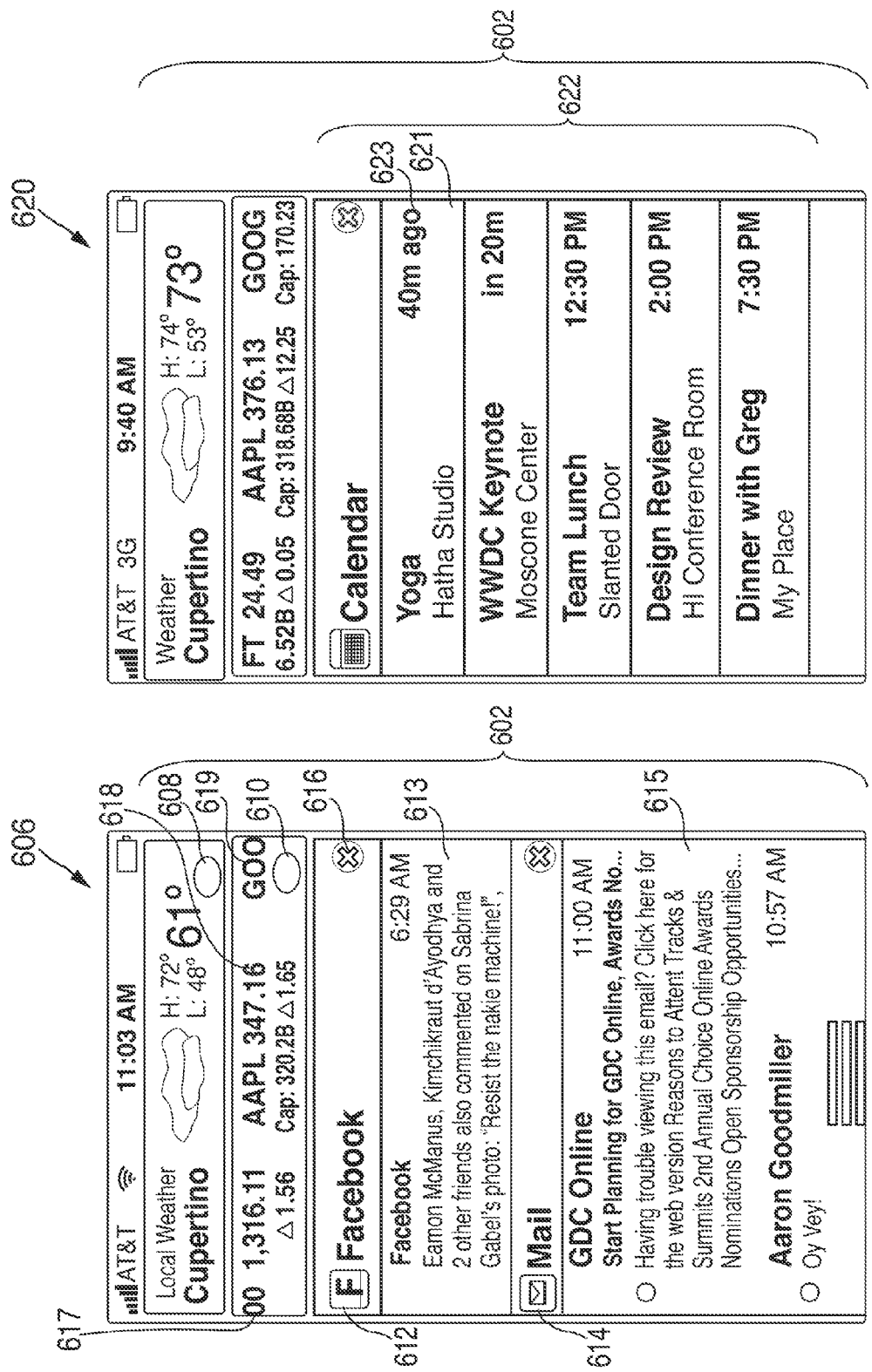

Weather
Cupertino  H: 74° L: 53°  73°

FT 24.49  AAPL 376.13  GOOG
6.52B △0.05  Cap: 318.68B △12.25  Cap: 170.23

⊗ Calendar

○ Invitation from: Paul Miller   9:41 AM
  Dinner with Mickey - 07/02/11 - 5:00PM Yoga   41m ago — 626
Hatha Studio

WWDC Keynote   in 20m
Moscone Center

Team Lunch   12:30 PM — 628
Slanted Door

Design Review   2:00 PM
H1 Conference Room

Weather
Cupertino  H: 74° L: 53°  73°

FT 24.49  AAPL 376.13  GOOG
6.52B △0.05  Cap: 318.68B △12.25  Cap: 170.23

⊗ Calendar

○ Invitation from: Paul Miller   9:41 AM
  Dinner with Mickey - 07/02/11 - 5:00PM Opening Day WWDC   All-Day
Moscone Center Team Lunch   12:30 PM
Slanted Door Design Review   2:00 PM
H1 Conference Room Flag Day   06/14 — 632

⎫
⎬ 622
⎭

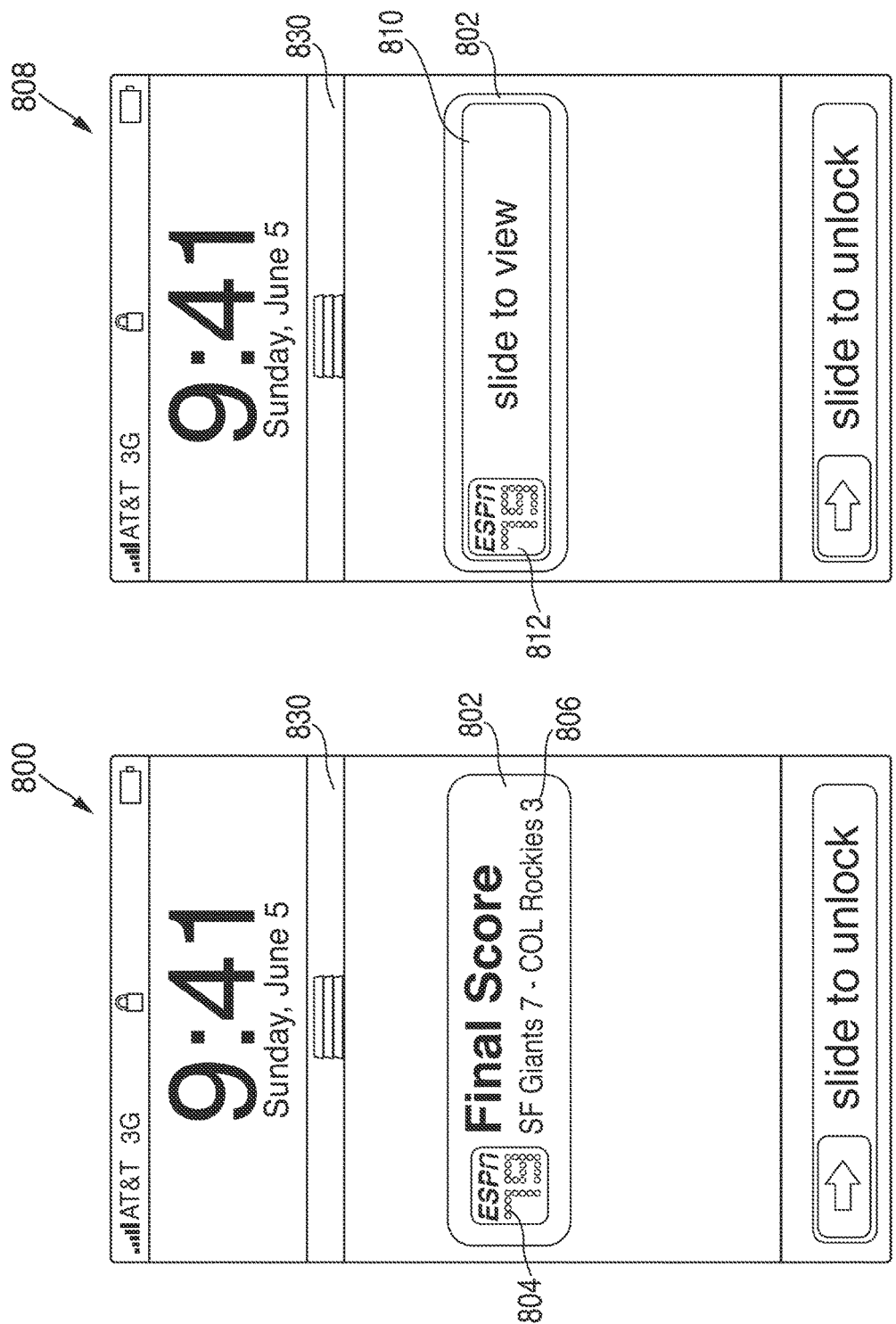

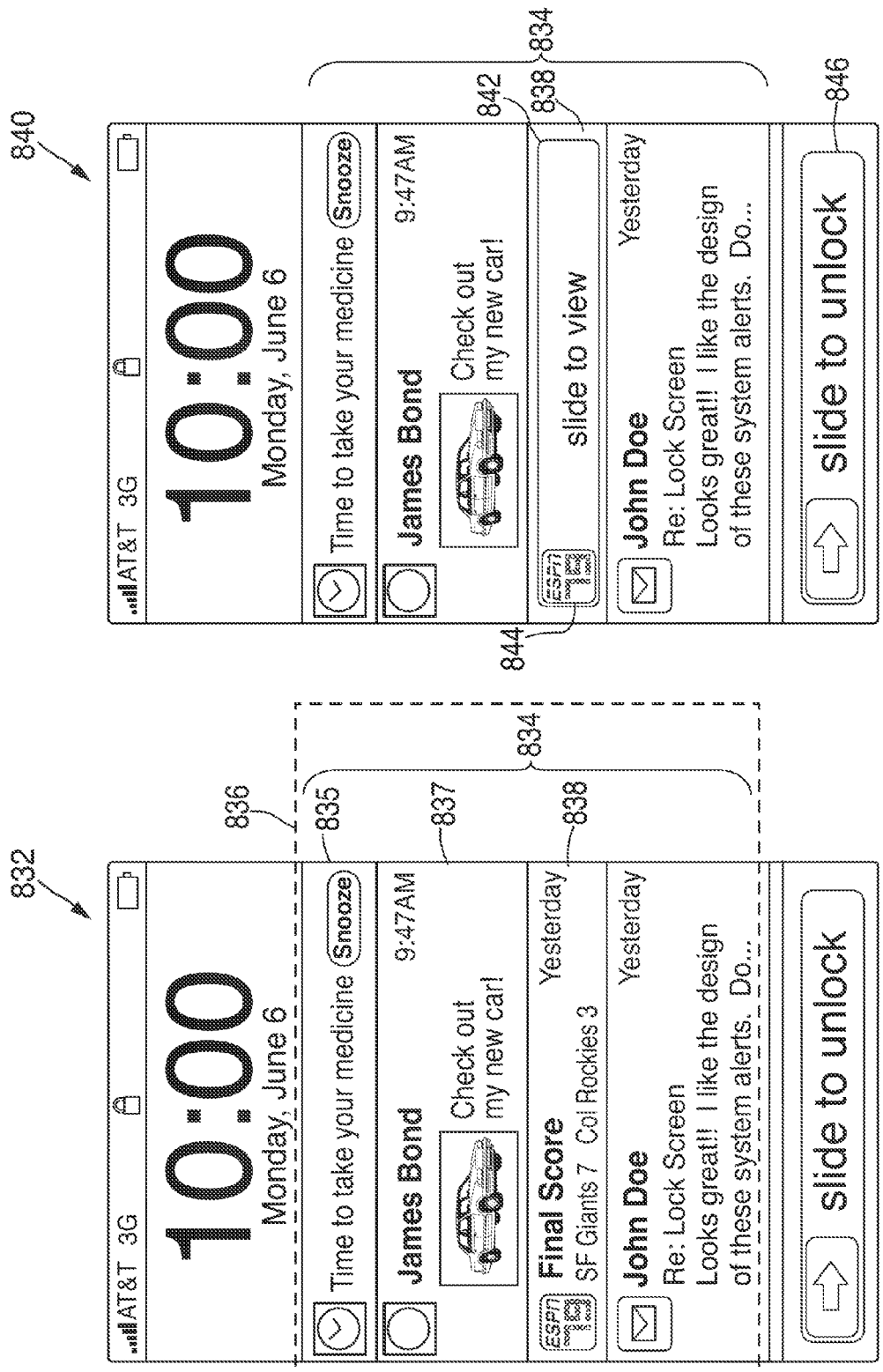

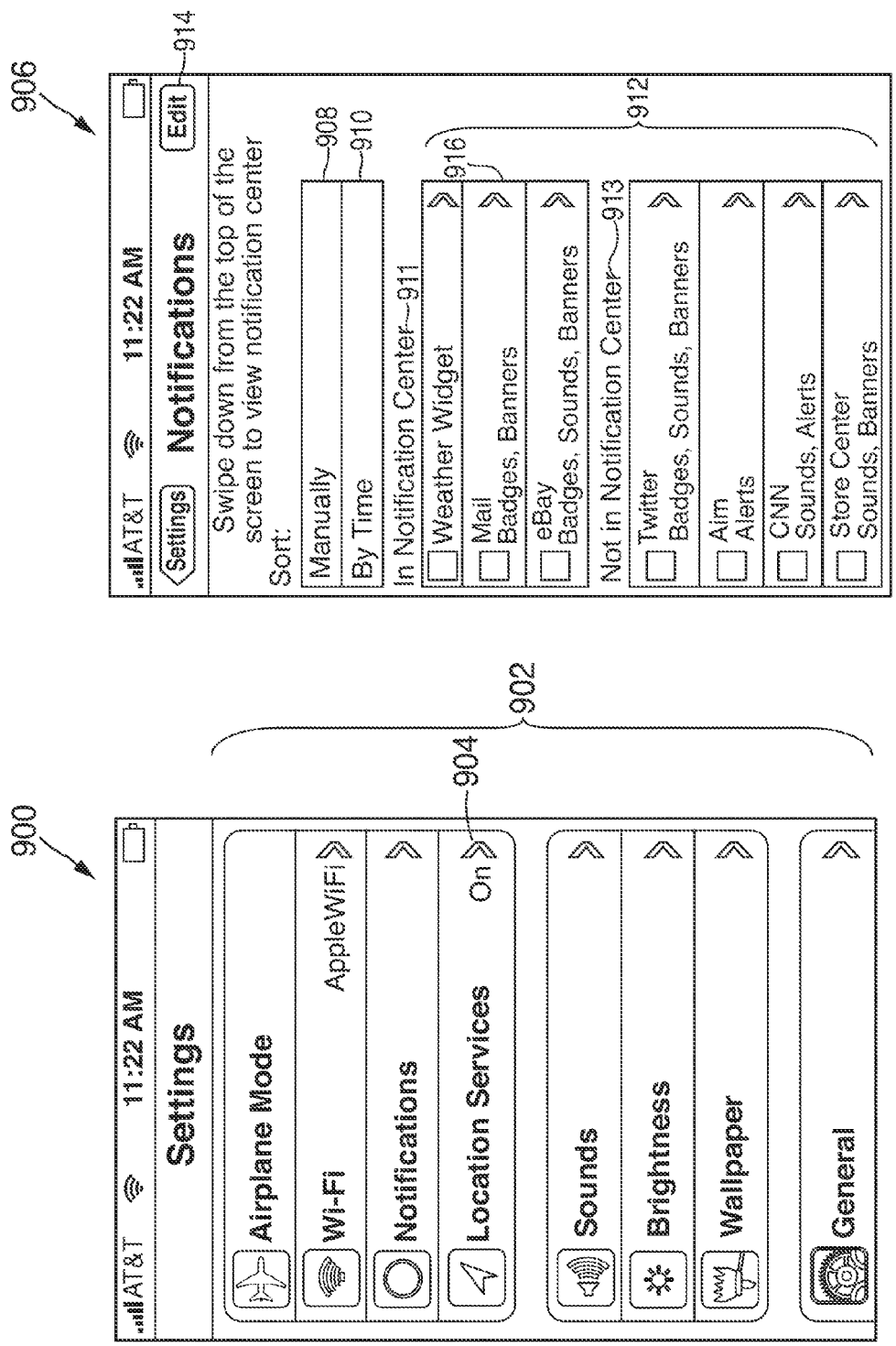

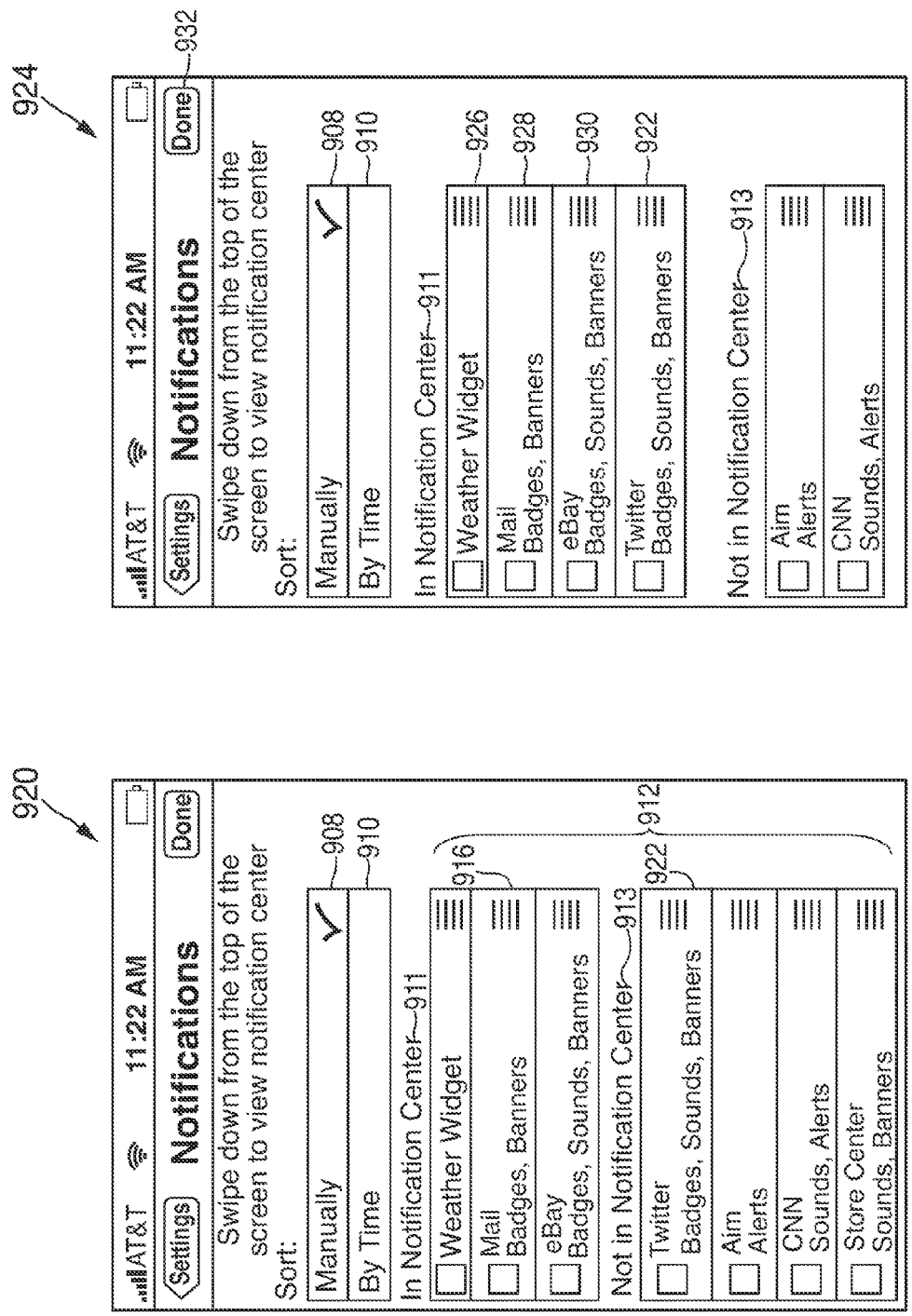

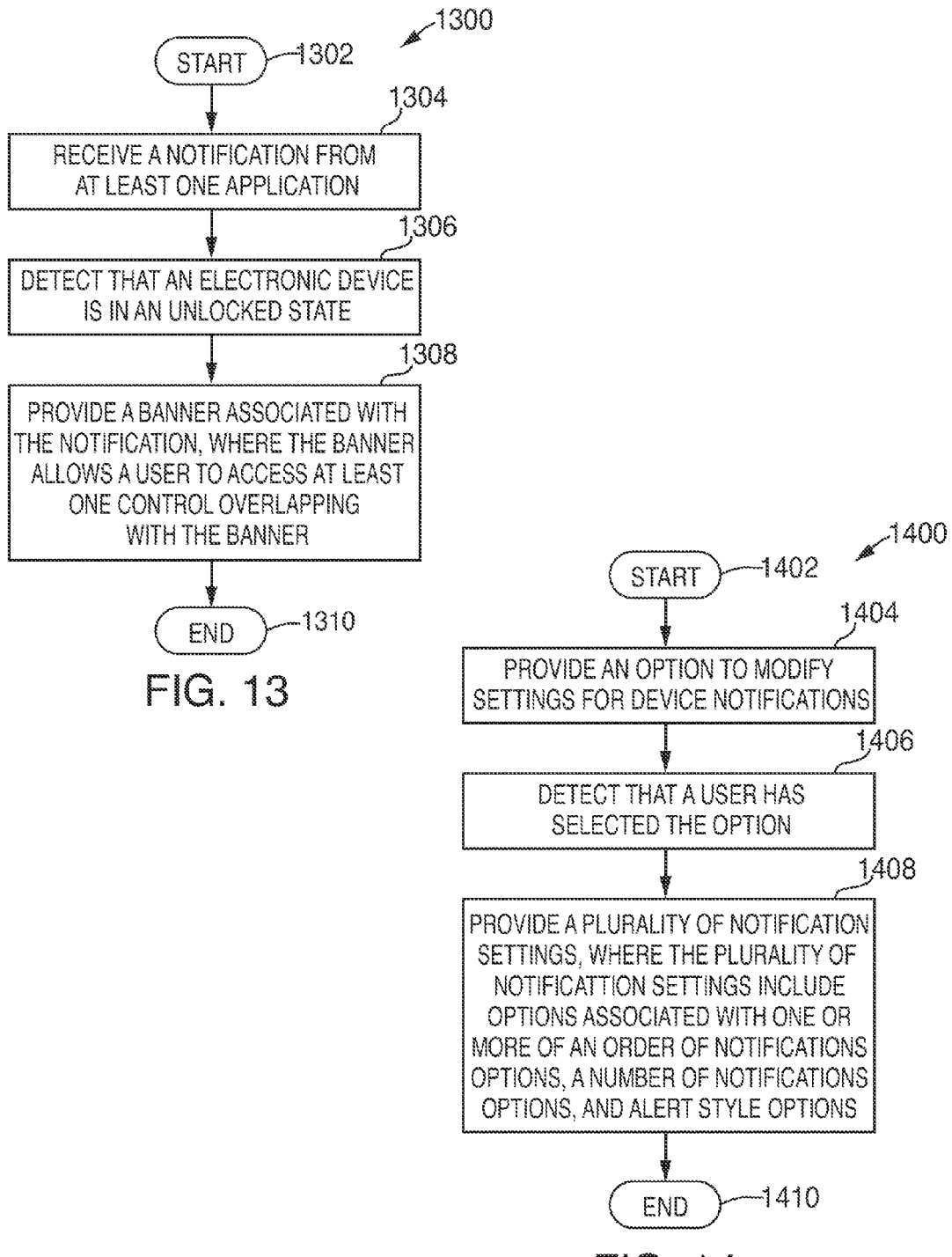

SYSTEMS AND METHODS FOR DISPLAYING NOTIFICATIONS RECEIVED FROM MULTIPLE APPLICATIONS

CROSS-REFERENCE TO RELATED APPLICATION

This application is a continuation of U.S. patent application Ser. No. 15/005,945, filed Jan. 25, 2016, entitled "SYSTEMS AND METHODS FOR DISPLAYING NOTIFICATIONS RECEIVED FROM MULTIPLE APPLICATIONS," which is a continuation of U.S. patent application Ser. No. 13/489,415, filed Jun. 5, 2012, entitled "SYSTEMS AND METHODS FOR DISPLAYING NOTIFICATIONS RECEIVED FROM MULTIPLE APPLICATIONS", which claims the benefit of U.S. Provisional Patent Application No. 61/493,470, filed Jun. 5, 2011, the disclosure of which is incorporated by reference herein in its entirety.

FIELD OF THE INVENTION

The disclosed embodiments relate generally to electronic devices, and more particularly, to electronic devices displaying notifications received from multiple applications.

BACKGROUND OF THE DISCLOSURE

Today's portable electronic devices are able to integrate multiple functionalities. These devices are capable of running multiple applications. In particular, some of these applications may generate trigger events that can result in the display of a notification.

Because electronic devices can contain many applications, the potential for application-based notifications can become numerous and unwieldy, particularly if a user is required to access each application individually in order to view application-specific notifications. Accordingly, what is needed is a more efficient and intuitive approach for organizing notifications and providing users with instant access to these notifications.

SUMMARY OF THE DISCLOSURE

Systems and methods are disclosed for displaying notifications received from multiple applications. An electronic device can have a touch-sensitive input/output ("I/O") device (e.g., a touch screen) with a graphical user interface ("GUI"), one or more processors, memory, and one or more modules, programs, or sets of instructions stored in the memory for performing multiple functions.

In particular, the electronic device can include a notification module that can interface with one or more Application Programming Interfaces ("APIs") to generate various types of notifications while the device is in either a locked state or an unlocked state. Furthermore, the notification module can provide options for customizing notification settings.

In some embodiments, the notification module can monitor notifications that are received from multiple applications. Responsive to receiving the notifications, the notification module can control the manner in which the notifications are displayed while the electronic device is operating in a locked or an unlocked state. In some embodiments, the electronic device can allow a user to customize how notifications are displayed while the device is in the locked and/or the unlocked state.

In some embodiments, while the device is operating in a locked state, the notification module can display a pull-down option, which can allow a user to view previously received notifications. In some embodiments, the notification module can aggregate the notifications that are received, and can provide the aggregated notifications as multiple panes in a notification center. Thus, each pane of the notification center can be associated with a different application. In addition, the notification module can display banners that correspond to one or more notifications that are received from different applications.

The one or more APIs that interface with the notification module can be in an environment with calling program code interacting with another program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, and/or other types of invocations or parameters via the API.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which:

FIG. 5 is a display screen associated with a home screen of an electronic device in accordance with various embodiments of the invention;

FIGS. 6A-6E are display screens associated with an illustrative notification center in accordance with various embodiments of the invention;

FIGS. 8A-8F are display screens associated with displaying notifications while an electronic device is operating in a locked state in accordance with various embodiments of the invention;

FIGS. 9A-9F are display screens associated with customizing notification settings in accordance with various embodiments of the invention;

FIG. 13 is a flowchart of an illustrative process for providing a banner in accordance with various embodiments of the invention; and FIG. 14 is a flowchart of an illustrative process for providing notification settings in accordance with various embodiments of the invention.

DETAILED DESCRIPTION OF THE DISCLOSURE

Systems and methods for displaying notifications received from multiple applications are provided.

Figure 1:
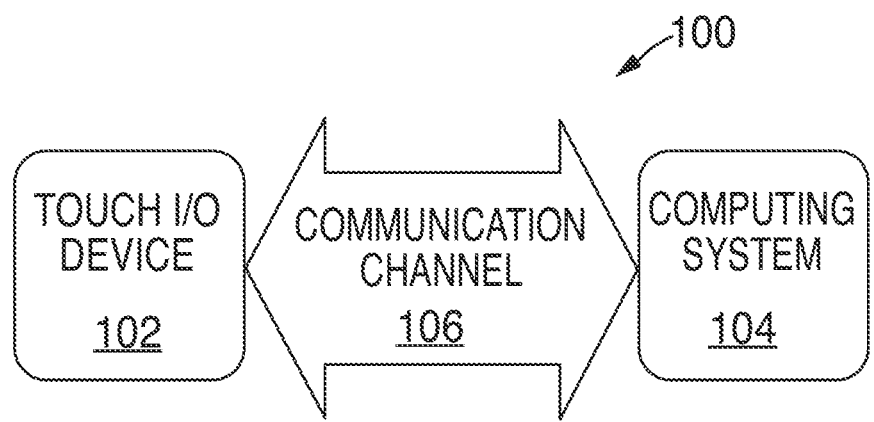
FIGS. 1 and 2 are block diagrams of electronic devices configured in accordance with various embodiments of the invention.

FIG. 1 illustrates a block diagram of electronic device 100 that includes touch I/O device 102 that can receive touch input for interacting with computing system 104 via wired or wireless communication channel 106. Touch I/O device 102 may be used to provide user input to computing system 104 in lieu of or in combination with other input devices such as a keyboard, mouse, etc. One or more touch I/O devices 102 may be used for providing user input to computing system 104. Touch I/O device 102 may be an integral part of computing system 104 (e.g., touch screen on a laptop) or may be separate from computing system 104.

Touch I/O device 102 may include a touch sensitive panel which is wholly or partially transparent, semitransparent, non-transparent, opaque or any combination thereof. Touch I/O device 102 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 102 embodied as a touch screen may include a transparent and/or semitransparent touch sensitive panel partially or wholly positioned over at least a portion of a display. According to this embodiment, touch I/O device 102 functions to display graphical data transmitted from computing system 104 (and/or another source) and also functions to receive user input. In other embodiments, touch I/O device 102 may be embodied as an integrated touch screen where touch sensitive components/devices are integral with display components/devices. In still other embodiments, a touch screen may be used as a supplemental or additional display screen for displaying supplemental or the same graphical data as a primary display and to receive touch input.

Touch I/O device 102 may be configured to detect the location of one or more touches or near touches on device 102 based on capacitive, resistive, optical, acoustic, inductive, mechanical, chemical measurements, or any phenomena that can be measured with respect to the occurrences of the one or more touches or near touches in proximity to device 102. Software, hardware, firmware or any combination thereof may be used to process the measurements of the detected touches to identify and track one or more gestures. A gesture may correspond to stationary or non-stationary, single or multiple, touches or near touches on touch I/O device 102. A gesture may be performed by moving one or more fingers or other objects in a particular manner on touch I/O device 102 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 104 may drive a display with graphical data to display a graphical user interface (GUI). The GUI may be configured to receive touch input via touch I/O device 102. Embodied as a touch screen, touch I/O device 102 may display the GUI. Alternatively, the GUI may be displayed on a display separate from touch I/O device 102. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 102 that may be associated with the graphical elements of the GUI. In other embodiments, the user may perform gestures at one or more locations that are independent of the locations of graphical elements of the GUI. Gestures performed on touch I/O device 102 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 104 (e.g., affect a state or mode of a GUI, application, or operating system). Gestures may or may not be performed on touch I/O device 102 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 106 in response to or based on the touch or near touches on touch I/O device 102. Feedback may be transmitted optically, mechanically, electrically, olfactory, acoustically, or the like or any combination thereof and in a variable or non-variable manner.

Figure 2:
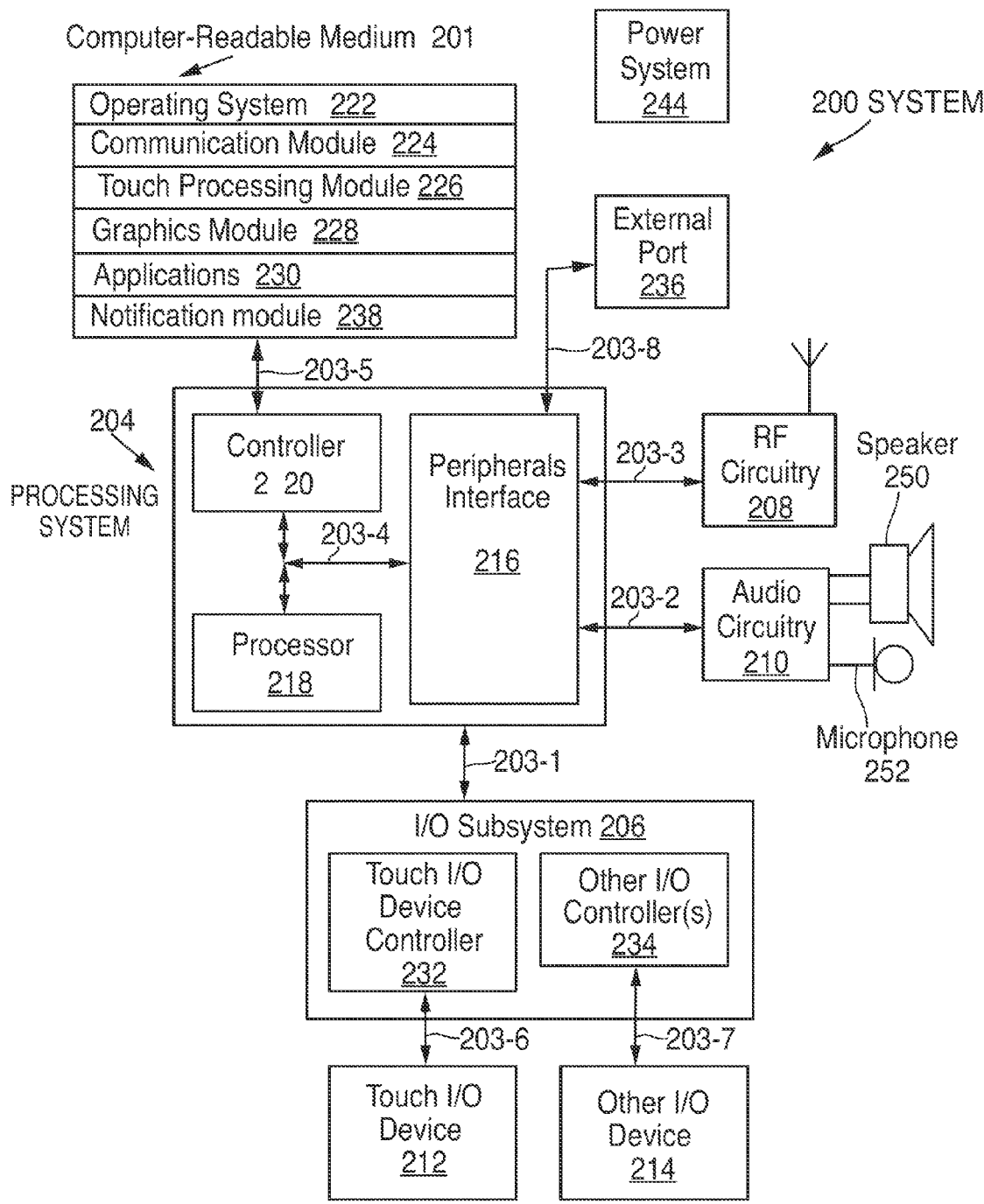

Attention is now directed towards embodiments of a system architecture that may be embodied within any portable or non-portable device including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. FIG. 2 is a block diagram of one embodiment of system 200 that can include one or more computer-readable mediums 201, processing system 204, input/Output (I/O) subsystem 206, radio frequency (RF) circuitry 208, and audio circuitry 210. These components may be coupled by one or more communication buses or signal lines 203. System 200 can be the same as or similar to electronic device 100 (FIG. 1).

It should be apparent that the architecture shown in FIG. 2 is only one example architecture of system 200, and that system 200 could have more or fewer components than shown, or a different configuration of components. The various components shown in FIG. 2 can be implemented in hardware, software, firmware or any combination thereof, including one or more signal processing and/or application specific integrated circuits.

RF circuitry 208 is used to send and receive information over a wireless link or network to one or more other devices and includes well-known circuitry for performing this function. RF circuitry 208 and audio circuitry 210 can be coupled to processing system 204 via peripherals interface 216. Interface 216 can include various known components for establishing and maintaining communication between peripherals and processing system 204. Audio circuitry 210 can be coupled to audio speaker 250 and microphone 252 and includes known circuitry for processing voice signals received from interface 216 to enable a user to communicate in real-time with other users. In some embodiments, audio circuitry 210 includes a headphone jack (not shown).

Peripherals interface 216 can couple the input and output peripherals of the system to processor 218 and computer-readable medium 201. One or more processors 218 can communicate with one or more computer-readable mediums 201 via controller 220. Computer-readable medium 201 can be any device or medium that can store code and/or data for use by one or more processors 218. Medium 201 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 201 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 218 can run various software components stored in medium 201 to perform various functions for system 200. In some embodiments, the software components include operating system 222, communication module (or set of instructions) 224, touch processing module (or set of instructions) 226, graphics module (or set of instructions) 228, one or more applications (or set of instructions) 230, and notification module 238. Each of these modules and above noted applications correspond to a set of instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules may be combined or otherwise rearranged in various embodiments. In some embodiments, medium 201 may store a subset of the modules and data structures identified above. Furthermore, medium 201 may store additional modules and data structures not described above.

Operating system 222 can include various procedures, sets of instructions, software components and/or drivers for controlling and managing general system tasks (e.g., memory management, storage device control, power management, etc.) and facilitates communication between various hardware and software components.

Communication module 224 facilitates communication with other devices over one or more external ports 236 or via RF circuitry 208 and includes various software components for handling data received from RF circuitry 208 and/or external port 236.

Graphics module 228 can include various known software components for rendering, animating and displaying graphical objects on a display surface. In embodiments in which touch I/O device 212 is a touch sensitive display (e.g., touch screen), graphics module 2028 includes components for rendering, displaying, and animating objects on the touch sensitive display.

One or more applications 230 can include any applications installed on system 200, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 226 includes various software components for performing various tasks associated with touch I/O device 212 including but not limited to receiving and processing touch input received from I/O device 212 via touch I/O device controller 232. For example, touch processing module 226 can also include software components for performing tasks associated with other I/O devices 214. That is, touch processing module 226 can receive and process inputs received from I/O device 214 via other I/O controller 234.

System 200 may further include notification module 238 for performing the method/functions as described herein in connection with FIGS. 5-14. Notification module 238 may at least function to monitor notifications that are received from multiple applications (e.g., multiple applications on system 200 or data providers that are transmitting data to system 200). For example, notification module 238 can receive notifications from both non-third party applications and third party applications. In addition, notification module 238 can receive push-based notifications, trigger-based notifications, and/or other types of personal notifications.

Responsive to receiving the notifications, notification module 238 can control the manner in which the notifications are displayed while system 200 is operating in a locked state or an unlocked state. For example, while system 200 is operating in a locked state, notification module 238 can display notifications in a banner, and control the manner in which these notifications are displayed. As another example, notification module 238 can aggregate notifications that are received, and can provide the aggregated notifications as multiple panes in a notification center. Thus, each pane can be associated with a different application. In some embodiments, notification module 238 can allow a user to customize how notifications are displayed on system 200.

In a locked state, system 200 may limit user access to certain features. For example, in a locked state, the user may not be able to activate various device features, such as placing a telephone call, or entering en email. In other words, the locked state is meant to prevent inadvertent access to system 200. When system 200 is an unlocked state, the user has full access to all features of the system.

Moreover, notification module 238 can provide a specific type of data formatting to data providers, which can then allow the data providers to direct particular notifications to various users. Persons skilled in the art will appreciate that any suitable type of formatting may also be used. For example, in order to display a notification on system 200, notification module 238 can require a data provider to specify the title (e.g., name of user), the subtitle (e.g., the subtitle of an incoming message or alert), and the body (e.g., body of the message).

Notification module 238 may also interface with touch processing module 226 in order to receive user inputs. In addition, notification module 238 can interface with graphics module 228 in order to display various graphical objects on a display. Notification module 238 may be embodied as hardware, software, firmware, or any combination thereof. Although notification module 238 is shown to reside within medium 201, all or portions of module 238 may be embodied within other components within system 200 or may be wholly embodied as a separate component within system 200.

I/O subsystem 206 is coupled to touch I/O device 212 and one or more other I/O devices 214 for controlling or performing various functions. Touch I/O device 212 communicates with processing system 204 via touch I/O device controller 232, which includes various components for processing user touch input (e.g., scanning hardware). One or more other input controllers 234 receives/sends electrical signals from/to other I/O devices 214. Other I/O devices 214 may include physical buttons, dials, slider switches, sticks, keyboards, touch pads, additional display screens, or any combination thereof.

If embodied as a touch screen, touch I/O device 212 displays visual output to the user in a GUI. The visual output may include text, graphics, video, and any combination thereof. Some or all of the visual output may correspond to user-interface objects. Touch I/O device 212 forms a touch-sensitive surface that accepts touch input from the user. Touch I/O device 212 and touch screen controller 232 (along with any associated modules and/or sets of instructions in medium 201) detects and tracks touches or near touches (and any movement or release of the touch) on touch I/O device 212 and converts the detected touch input into interaction with graphical objects, such as one or more user-interface objects. In the case in which device 212 is embodied as a touch screen, the user can directly interact with graphical objects that are displayed on the touch screen. Alternatively, in the case in which device 212 is embodied as a touch device other than a touch screen (e.g., a touch pad), the user may indirectly interact with graphical objects that are displayed on a separate display screen embodied as I/O device 214.

Touch I/O device 212 may be analogous to the multi-touch sensitive surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

Embodiments in which touch I/O device 212 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 212 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 200 can also include power system 244 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 216, one or more processors 218, and memory controller 220 may be implemented on a single chip, such as processing system 204. In some other embodiments, they may be implemented on separate chips.

Notification module 238 can interface with one or more Application Programming Interfaces ("APIs") to provide a notification center that can generate various types of notifications when system 200 is in either a locked state or an unlocked state. Furthermore, notification module 238 can provide multiple settings for customizing the notification center.

An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (e.g., on the same data processing system as the API-implementing component) or a remote component (e.g., on a different data processing system from the API-implementing component) that communicates with the API-implementing component through the API over a network. It should be understood that an API-implementing component may also act as an API-calling component (e.g., it may make API calls to an API exposed by a different API-implementing component), and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embodiment, call APIs from different providers such as a set of APIs from an OS provider and another set of APIs from a plug-in provider and another set of APIs from another provider (e.g. the provider of a software library) or creator of the another set of APIs.

Figure 3:
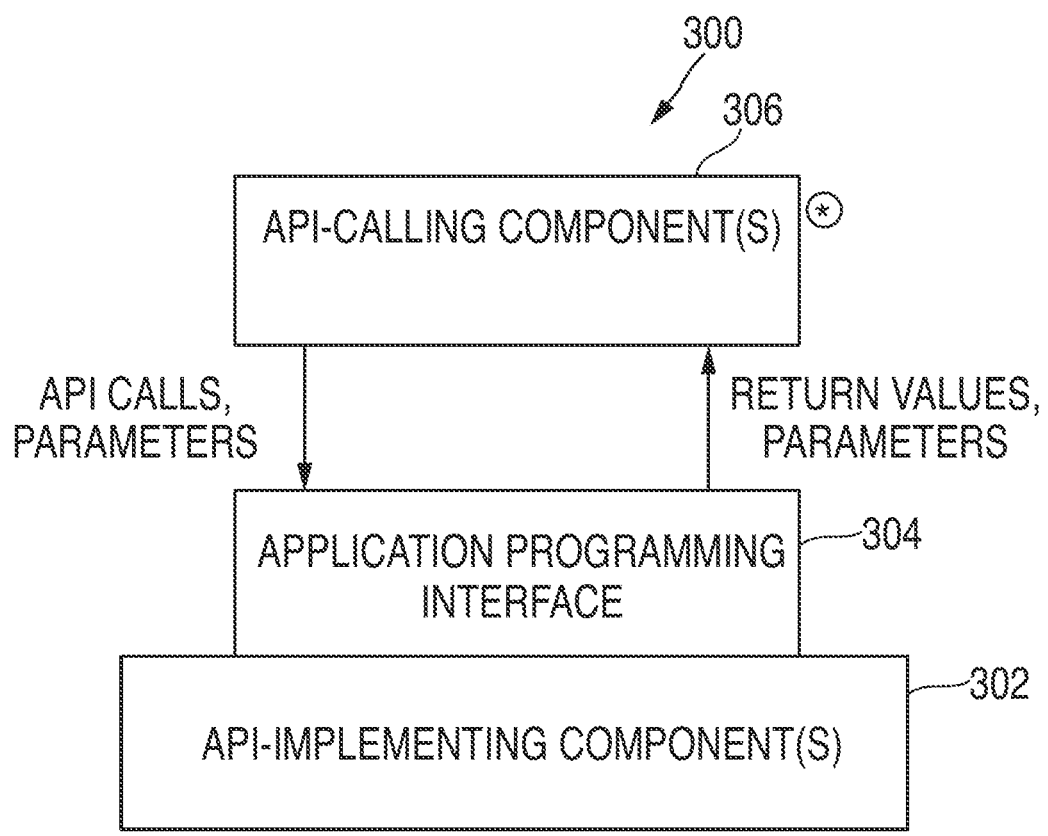
FIGS. 3 and 4 are block diagrams of application programming interface ("API") architectures in accordance with various embodiments of the invention.

FIG. 3 is a block diagram illustrating an exemplary API architecture 300, which may be used in some embodiments of the invention. As shown in FIG. 3, the API architecture 300 includes the API-implementing component 302 (e.g., an operating system, a library, a device driver, an API, an application program, software or other module) that implements the API 304. API 304 specifies one or more functions, methods, classes, objects, protocols, data structures, formats and/or other features of API-implementing component 302 that may be used by API-calling component 306. API 304 can specify at least one calling convention that specifies how a function in API-implementing component 302 receives parameters from API-calling component 306 and how the function returns a result to API-calling component 306. API-calling component 306 (e.g., an operating system, a library, a device driver, an API, an application program, software or other module), makes API calls through API 304 to access and use the features of the API-implementing component 302 that are specified by API 304. API-implementing component 302 may return a value through API 304 to API-calling component 306 in response to an API call.

It will be appreciated that API-implementing component 302 may include additional functions, methods, classes, data structures, and/or other features that are not specified through API 304 and are not available to API-calling component 306. It should be understood that API-calling component 306 may be on the same system as API-implementing component 302 or may be located remotely and accesses API-implementing component 302 using API 304 over a network. While FIG. 3 illustrates a single API-calling component 306 interacting with API 304, it should be understood that other API-calling components, which may be written in different languages (or the same language) than API-calling component 306, may use API 304.

API-implementing component 302, API 304, and API-calling component 306 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 4:
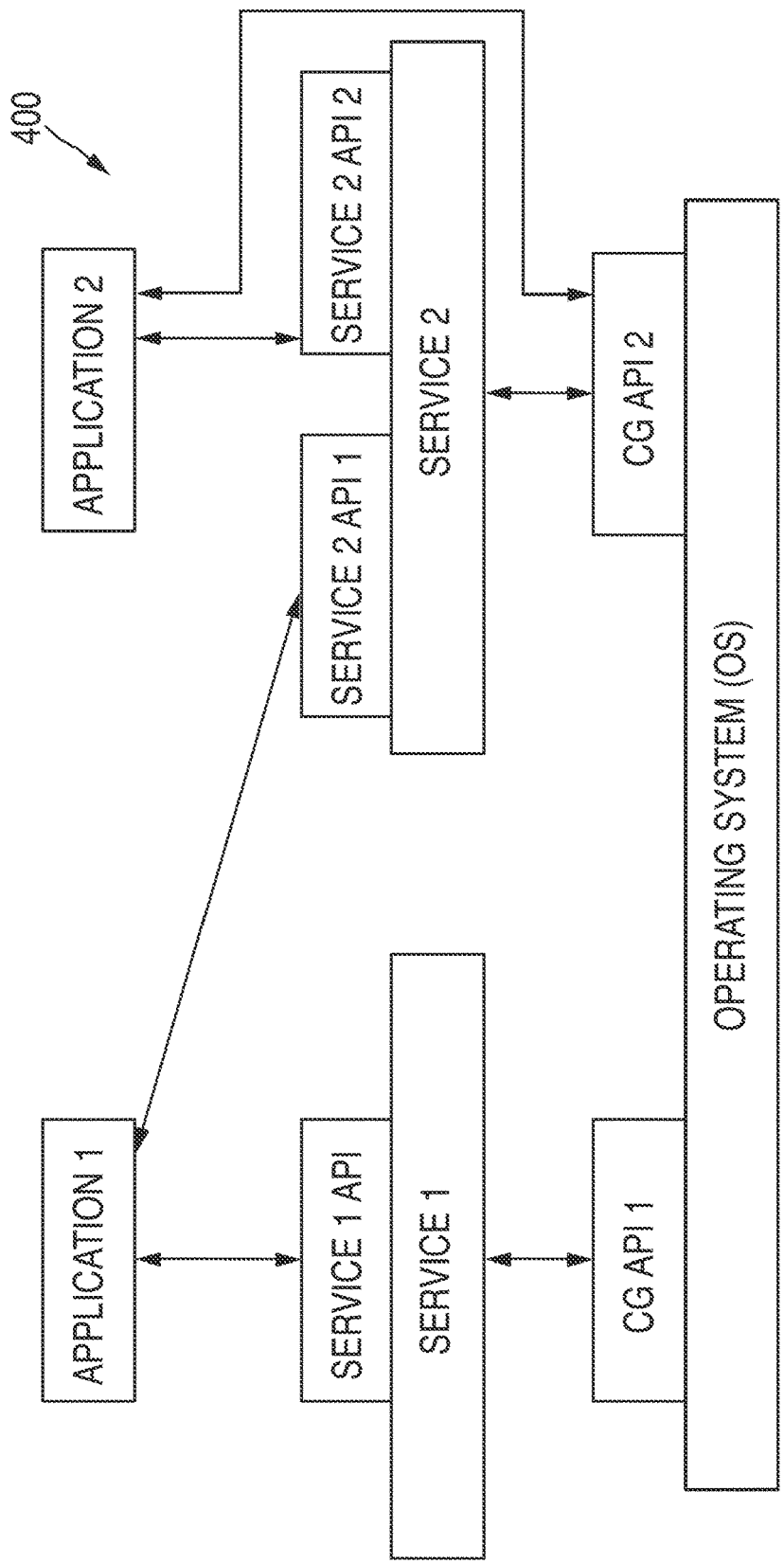

In FIG. 4 ("Software Stack"), an exemplary embodiment, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

As discussed above, a notification module of an electronic device (e.g., notification module 238 of FIG. 2) can control the manner in which notifications are received from applications and then provided to a user. For example, the notification module can aggregate notifications that are received from different applications, and can provide the aggregated notifications as a series of panes (or listings) in a notification center. Accordingly, by accessing the notification center, the user can view a listing of recently received notifications. In some cases, the notification center may only be accessible while the electronic device is operating in an unlocked state.

Any suitable approach may be used to invoke the notification center. For example, a user may invoke the notification center by pressing a button on an electronic device. As another example, when an electronic device (e.g., electronic device 100 of FIG. 1 or system 200 of FIG. 2) is a device where operation of a predefined set of functions on the device is performed through a touch screen and/or a touchpad (e.g., touch I/O device 212), a user can invoke the notification center by making a contact or by touching graphics on a touch screen.

Figures 5, 6A:
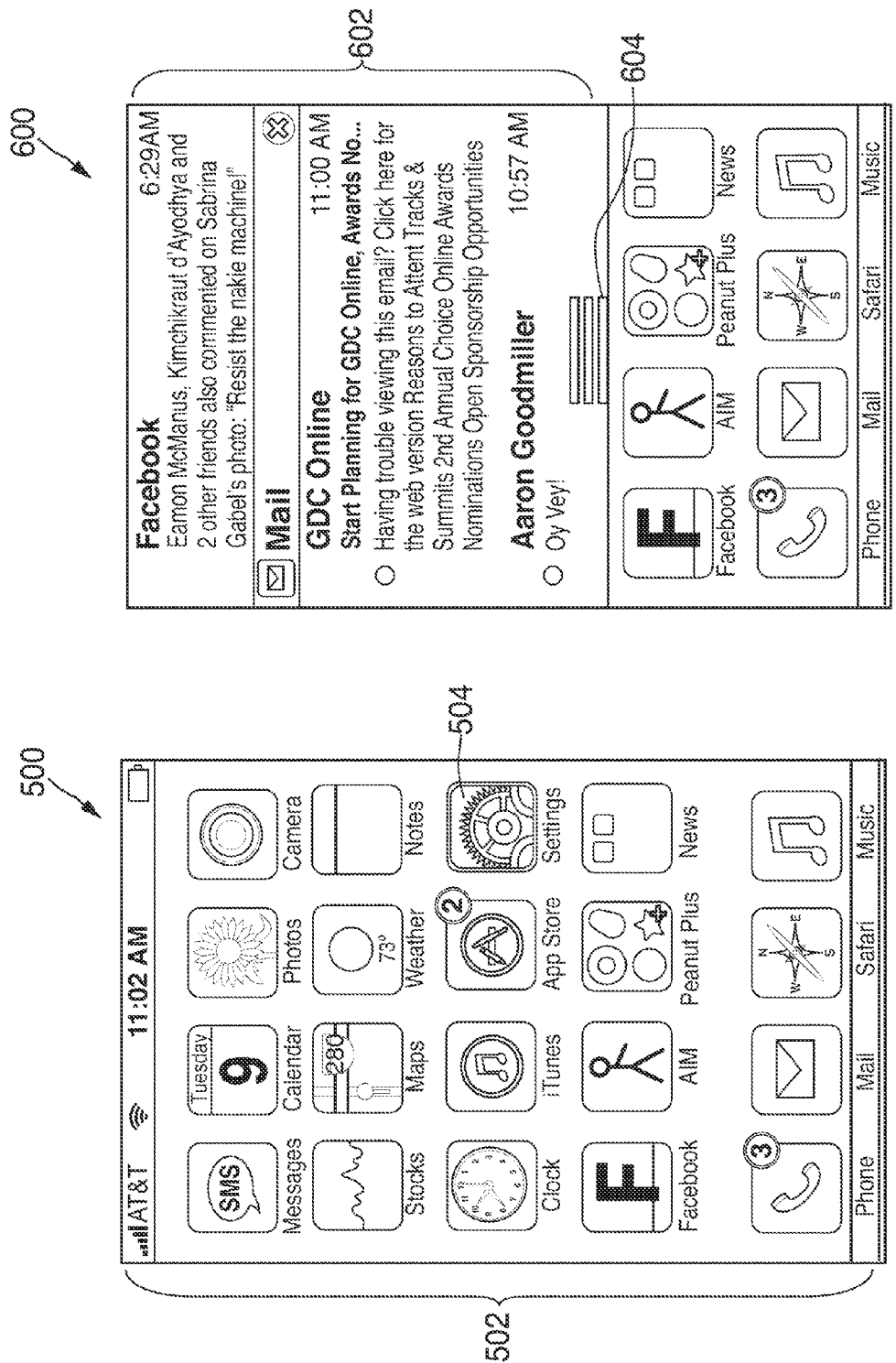

For instance, referring now to FIG. 5, display screen 500 is shown of a home screen of an electronic device. Display screen 500 can be the same as or can interface with touch I/O device 212 of FIG. 2. Display screen 500 can include multiple selectable icons 502.

The notification module may be configured to accept multiple gestures for invoking the notification center. For example, a user can perform a gross swipe gesture by quickly flicking one or more fingers in a downward motion from the top of screen 500. As another example, the user can slowly drag one or more fingers downwards from the top of screen 500.

The notification module can detect the swipe or drag by the user in a particular region of screen 500 (e.g., a twenty-pixel region at the top of screen 500). In particular, once the notification module detects that there is movement in multiple pixels in the twenty-pixel region, the notification module can begin to display the notification center.

In some embodiments, the notification module can display the notification center in the same manner regardless of the way in which the user invokes the notification center. In other embodiments, the notification module can respond differently depending on the gestures made by user. For example, if the user performed a gross swipe gesture, the notification module can immediately pull down the notification center to the bottom of screen 500. If the user instead slowly drags one or more fingers downwards, the notification module may pull down the notification center on screen 500 in real-time.

In some cases, a visual indication may be displayed on the top of display screen 500 to indicate the presence of a notification center. In other embodiments (and as shown in display screen 500), there may be no visual indication of the presence of a notification center. As such, the user can avoid being distracted while using the electronic device and valuable space on the screen can be conserved.

Persons skilled in the art will appreciate that instead of the top of display screen 500, the notification center can be accessed from any suitable portion of display screen 500 (e.g., right, left, or bottom of display screen 500). In addition, the notification module may allow a user to specify which portion of display screen 500 to use for invoking the notification center.

Persons skilled in the art will also appreciate that although FIG. 5 shows a home screen, the notification center can be invoked at any suitable time. In particular, the notification center may also be invoked while the device is displaying a particular application.

Turning now to FIGS. 6A-6E, display screens are shown of a notification center on an electronic device. Persons skilled in the art will appreciate that although notification center is displayed in FIGS. 6A-6E while the electronic device is operating in a portrait mode, the notification center can also be displayed while the electronic device is operating in a landscape mode.

Turning first to FIG. 6A, responsive to a user dragging one or more fingers downwards from the top of display screen 600, a notification module can pull down notification center 602 towards the bottom of display screen 600. Notification center 602 can include tab 604 at a bottom portion of notification center 602.

In some cases, in order to remove notification center 602 from display screen 600, the user may need to drag notification center 602 up and off of display screen 600. Persons skilled in the art will appreciate that any other suitable approach may be used to remove notification center 602 from display screen 600 (e.g., by pressing a home or an on/off button).

Turning next to FIG. 6B, display screen 606 shows notification center 602 being pulled all the way to the bottom of screen 606. Notification center 602 can include one or more panes, where each pane can include a widget representing a different application on the electronic device. For example, notification center 602 can include weather pane 608, stock pane 610, social network pane 612, and mail pane 614.

Notification center 602 can be scrollable, such that a user can contact and drag notification center 602 up and down in order to view fewer or additional notifications. In some embodiments, only certain portions of notification center 602 can be made scrollable. As a result, one or more panes may remain fixed (e.g., weather pane 608 and stock pane 612), whereas other panes may be scrollable.

Weather pane 608 can display the weather for the current location of the electronic device. Alternatively, weather pane 608 can display the weather for any default location that a user has specified. The user may touch weather pane 608 to open the weather application on the device. In addition, the user may swipe weather pane 608 left or right in order to view weather for other cities.

Stock pane 610 can include a scrollable stock ticker that scrolls, for example, from right to left independent of any user interaction. The user may be able to drag stock pane 610 left or right in order to view other hidden or partially-displayed stocks. In some cases, the user may select any one of the individual stock tickers by touching the ticker (e.g., one of stock tickers 617-619). Responsive to the user's selection, the notification module can open a stock widget. The stock widget can be contextually based on the selected stock ticker (e.g., the stock widget can display detailed stock information corresponding to the selected corporation).

A user may select (e.g., touch) any pane in notification center 602 to access the application associated with the pane.

For example, responsive to the user selecting social network pane 612, the notification module can provide the social network application to the user.

Each of panes 608-614 can be associated with an option for allowing a user to manually clear out notifications from the pane. For example, button 616 can allow a user to clear notifications out of notification center 602 for pane 612. In particular, responsive to a user selecting button 616, the notification module can display a "CLEAR" button (e.g., button 616 can roll over, expand, and/or transition into a "CLEAR" button). If the user then selects the "CLEAR" button, the user can manually remove one or more notifications from notification center 602.

In some cases, button 616 can allow a user to clear out all of the notifications in a particular pane (or application). As a result, the corresponding pane can be removed from notification center 602. However, once a new notification is received for that application, a pane corresponding to the application can again be displayed in notification center 602. Persons skilled in the art will appreciate that although notifications have been cleared from notifications center 602, these notifications may still be accessible from the applications that generated the notifications. Thus, if the user desires to view notifications that have been cleared from notifications center 602, he may view those notifications by accessing the corresponding applications.

Some panes, such as panes 612 and 614 can have an associated listing of one or more notifications. For example, social network pane 612 has listing 613 showing one notification, and email pane 614 shows listing 615 showing two email notifications. Any suitable number of notifications can listed as part of the associated listing. Each displayed notification can be selected, and upon selection, that notification is opened up in the application corresponding to its associated pane. For example, if the user selects the first email notification in listing 615, that email is opened for viewing in the mail application.

Panes that have an associated listing may be vertically scrollable (e.g., a user can scroll from one pane to the next to view the listings associated with each). Such panes are in contrast with panes 608 and 610, which are horizontally scrollable. A user can scroll from listing associated pane to listing associated pane while panes such as panes 608 and 610 remain in place. Thus, at any given moment, the user can scroll horizontally in panes 608 and 610, or scroll vertically through listing associated panes.

Referring now to FIG. 6C, display screen 620 shows notification center 602, which can include calendar pane 622. Calendar pane 622 can display a listing of notifications (e.g., upcoming events) in a user's calendar for a pre-determined time period (e.g., for the upcoming 24 hours). In some cases, calendar pane 622 can organize the upcoming events in chronological order. For example, the most recently upcoming event can be displayed at the top of the listing of notifications, followed by the next upcoming event, and so forth. Alternatively, the most recently upcoming event can be displayed at the bottom of the listing of notifications.

Calendar pane 622 can be adjusted in real-time while an event is in progress. For example, as shown in FIG. 6C, notification 621 can include text 623, which indicates that the event "Yoga" started 40 minutes ago. The notification module can continuously update text 623 while the event is ongoing.

In some embodiments, a user can specify a pre-determined number of notifications to be displayed for each application. Consequently, if the number of notifications that can be displayed exceeds the pre-determined number of notifications, the notification module can automatically clear out notifications from calendar pane 622. Notification settings for specifying a pre-determined number of notifications will be described in more detail in connection with FIGS. 9E and 9F.

As shown in FIG. 6C, the pre-determined number of notifications may be set to five. Thus, upon receipt of a new notification, the notification module can automatically remove a notification that is currently being displayed in calendar pane 622. For example, turning now to FIG. 6D, upon receipt of new notification 626 from a calendar application, the notification module can add new notification 626 to the top of calendar pane 622. However, because the number of notifications that can be displayed exceeds the pre-determined number of notifications, the notification module can remove notification 628 from calendar pane 622. In some cases, notification 628 can be associated with an event that has the latest start time in comparison to the other events displayed in calendar pane 622. Eventually, once another notification has been cleared out of calendar pane 622 (e.g., notification 626 has completed or has been dismissed), notification 628 can be added back to calendar pane 622.

Once a calendar event has lapsed, one or more notifications corresponding to the event can be automatically removed from calendar pane 622. For example, if the event "Yoga" lasts for an hour, notification 621 (FIG. 6C) corresponding to "Yoga" can be cleared out of calendar pane 622 once the event has completed. For instance, as shown in FIG. 6E, the notification module can automatically remove notification 621 from notification center 602 once the "Yoga" event has lapsed. In addition to removing notification 621, the notification module can add new notification 632 to calendar pane 622.

Persons skilled in the art will appreciate that the panes included in FIGS. 6A-6E are merely illustrative. Thus, any suitable panes that are associated with one or more applications on the device may be included in notification center 602. In some cases, notification center 602 may include those notifications that are displayed while a device is operating in a locked state. These types of notifications will be described in more detail in connection with FIGS. 8A-8F.

Figure 6F:
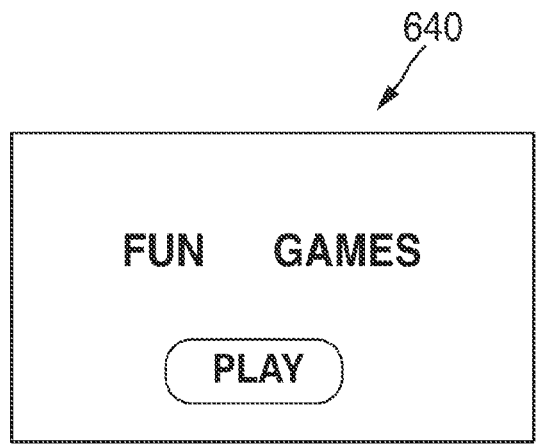
FIGS. 6F-6H are display screens associated with an illustrative notification center in accordance with various embodiments of the invention.
Figure 6G:
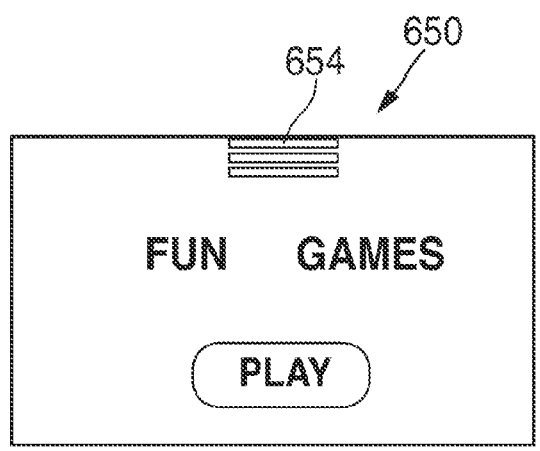
Figure 6H:
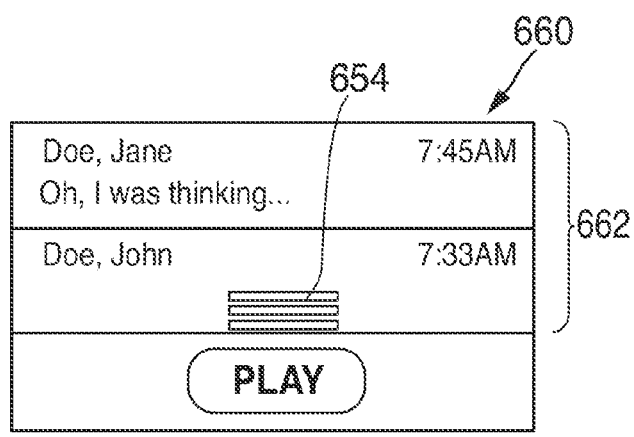

Referring now to FIGS. 6F-6H, several illustrative display screens showing display of a notification center while a user is actively participating in a third party application, such as a game. In FIG. 6F, display screen 640 shows an actively running third party application such as a game. While participating in the active third party application, the user may access a notifications center in accordance with an embodiment of the invention. The user may access the notifications center by first, swiping a finger down from the top of the screen to cause tab 654 to be displayed in screen 650 of FIG. 6G. When tab 654 is displayed, the user may then place a finger on tab 654 and drag it down to reveal notification center 662, as partially shown in screen 660 of FIG. 6H. If the user drags tab 654 all the way down to the bottom of screen 660, notification center 662 will be fully shown.

In some embodiments, while an electronic device is operating in an unlocked state, the notification module can display one or more banners that can correspond to notifications received from different applications. The notification module can display a banner by, for example, rotating the banner on to a display screen.

If the user has not selected the banner after a pre-determined period of time has lapsed (e.g., 5 or 6 seconds), the notification module can remove the banner from the display screen. For instance, the banner can be rotated out of the display screen. Alternatively, the user can push the banner away by swiping the banner or pushing the banner back.

In some embodiments, if two or more banners are received by the notification module at approximately the same time, the banners can be rotated into the display screen around the same time. That is, there may be multiple banners concurrently rotating into the display screen. Alternatively, to minimize the distractions to a user, the notification module can stagger the displaying of the banners such that only one banner is provided at any given time.

Persons skilled in the art will appreciate that any suitable visual approaches can be used for displaying banners. For example, banners can scroll across, flip up or drop down, or flutter into a display screen. Moreover, banners can be removed from the display screen in a similar function. The notification module may allow the user to specify the manner in which a banner can be displayed and/or removed.

In some cases, if a user ignores or removes a banner without accessing the banner, the notification module can add the notification associated with the banner to a notification center (e.g., notification center 602 of FIGS. 6A-6E). As a result, when the user later selects to view the notification center, the notification center can provide the user with an accumulation of all of the notifications that have not yet been accessed by the user.

Turning now to FIGS. 7A-7E, display screens are shown of different types of banners that can be displayed on an electronic device. Persons skilled in the art will appreciate that banners can be displayed at any suitable time while the device is operating in an unlocked state (e.g., while the device is displaying the home screen or displaying a particular application). For example, banners can be displayed while a user is playing a video game, accessing a website, modifying system settings, watching a movie, and the like. Persons skilled in the art will appreciate that although banners are displayed in FIGS. 7A-7E while the electronic device is operating in a portrait mode, banners can also be displayed while the electronic device is operating in a landscape mode. Persons skilled in the art will also appreciate that banners can be displayed in any suitable portion of a display screen (e.g., right, left, top, or bottom). In addition, the notification module may allow a user to specify which portion of a display screen a banner may appear.

Figure 7A:
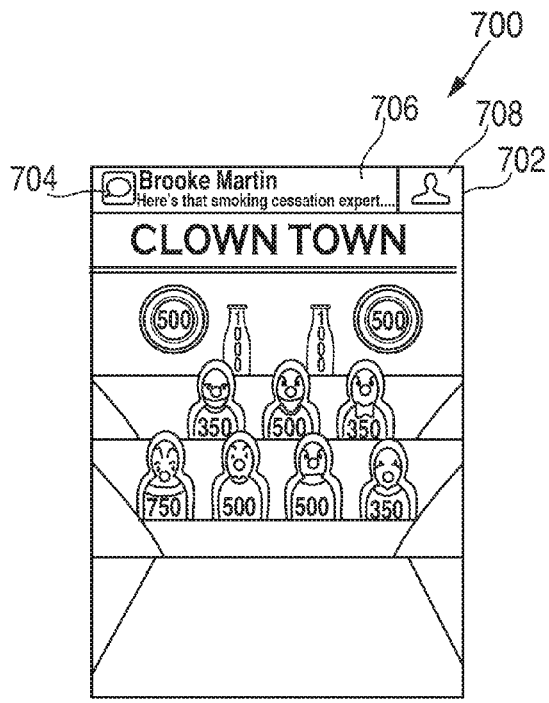
FIGS. 7A-7E are display screens associated with illustrative banners in accordance with various embodiments of the invention.

Referring first to FIG. 7A, display screen 700 is shown that can include banner 702. Banner 702 can represent a notification that was recently received (e.g., a text message that was received from a user's contact). As shown in FIG. 7A, banner 702 can be displayed while a user is playing a video game.

Banner 702 can include icon 704, text 706, and media 708. Icon 704 can indicate the type of application that generated the notification. Text 706 can include contact information and/or one or more portions of the text message that was received. In some cases, text 706 may be a truncated version of the full text of the notification (e.g., text 706 may include a portion of the body of a text or email). Media 708 can be an embedded media that is associated with the text message (e.g., a photo of the contact or a media file that was attached to the text message).

In some embodiments, the notification module can detect when a user has selected banner 702 (e.g., by touching banner 702). Responsive to the user's selection, the notification module can present the associated notification in the application that generated the notification. For example, in response to the user selecting banner 702, the notification module can display the particular text message corresponding to banner 702 in the text message application.

In some embodiments, a user may drag banner 702 down to view other notifications that are also associated with the application. Alternatively, in response to the user dragging down banner 702, the notification module can display the notification center. For example, the notification module can display the portion of the notification center that includes the application panel associated with banner 702. As another example, the notification module can display the portion of the notification center centered about the text message itself.

Figure 7B:
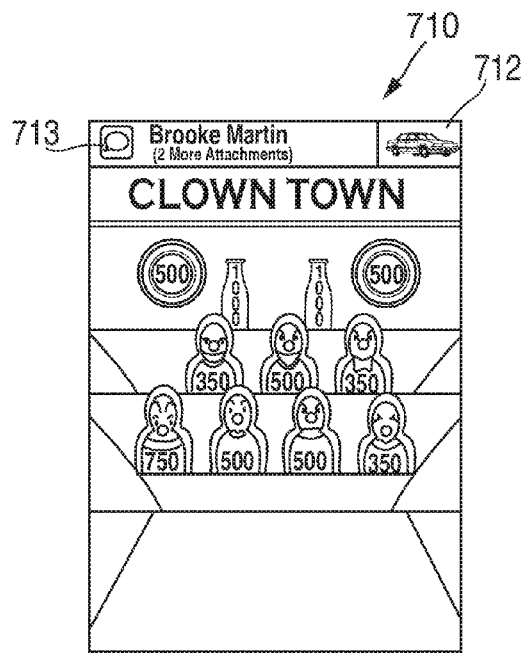

Turning now to FIG. 7B, display screen 710 is shown that can include banner 710. Banner 710 can include media 712, which can be a video that was attached to the notification. Persons skilled in the art will appreciate that media 712 can display any suitable media such as, for example, an image, a video, a sound file, a map, an electronic business card, etc.

In addition, banner 710 can include text 713, which can indicate that the notification is associated with multiple images and videos but not with any text. In particular, text 713 can indicate that there are two more attachments in addition to media 712. Thus, text 713 may change based on the number of attachments that are not displayed in banner 710.

Figure 7C:
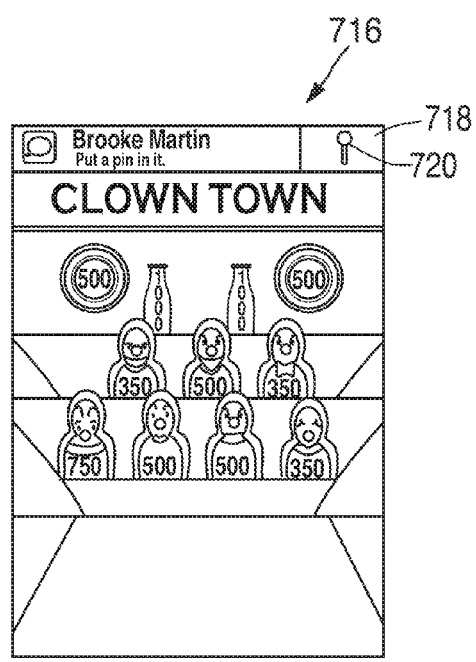

FIG. 7C shows display screen 716, which can include banner 718. Banner 718 can include map 720, which can be generated based on a notification that is associated with a map URL. For example, map 720 can be a localized map of the immediate vicinity of the location associated with the map URL. In addition, map 720 can include a pin that is mounted at a particular location associated with the map URL (e.g., the location of a restaurant or a movie theater).

Figure 7D:
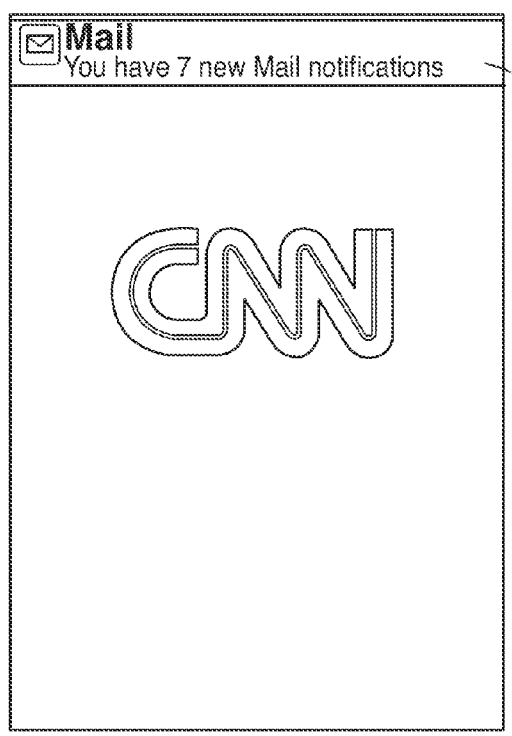

Turning now to FIG. 7D, display screen 722 is shown that includes banner 724. Banner 724 can be a coalesced banner. That is, banner 724 can include information regarding multiple notifications that have been queued for a particular application. For example, as shown in FIG. 7D, banner 724 indicates that there are 7 new mail notifications for the mail application.

The notification module can also generate coalesced banners using any other approach. For example, the notification module can detect if two or more notifications are associated with at least one common parameter (e.g., a particular subject matter). In response to detecting that the two or more notifications are associated with the at least one common parameter, the notification module can append the two or more notifications into a single message in a coalesced banner. As another example, the notification module can condense (e.g., summarize) the two or more notifications into a single message in a coalesced banner.

In some cases, the notification module can simultaneously display multiple coalesced banners (e.g., a grouping of banners), where each banner may display a single message. The banners can indicate that there are new notifications queued for multiple applications.

A notification module can also provide banners based on the occurrence of one or more trigger events (e.g., one or more time-based or location-based trigger events). For example, when the notification module receives a notification that is associated with a time-based trigger event (e.g., a reminder to perform a task at a particular time), the notification module can display a banner associated with the event at the start of the event or at a pre-defined time before the start of the event.

As another example, responsive to receiving a notification that is associated with a location-based trigger event (e.g., a reminder to buy milk at the grocery store), the notification module can display a banner associated with the event when the electronic device is detected in the location of a grocery store. In some embodiments, these alarm banners can include a "SNOOZE" button, which can allow the user to stop the alarm for a pre-determined period of time.

Banners that are displayed on an electronic device can be unobtrusive. That is, banners may not interfere with a user's access to overlapping controls on a display screen. For example, referring now to FIG. 7E, display screen 726 is shown that can include banner 728. Banner 728 may be overlaid over "NOTIFICATIONS" button 730. Because banner 728 is an unobtrusive banner, a user can still press "NOTIFICATIONS" button 730 while banner is positioned on top of button 730. In some embodiments, one or more visual indicators can also be displayed, which can indicate to the user that "NOTIFICATIONS" button 730 continues to be selectable despite the overlay of banner 728.

In some embodiments, the notification module can control the manner in which notifications are displayed while an electronic device is operating in a locked state (e.g., when the electronic device is not being used). In particular, when the device is operating in a locked state, one or more notifications can be received from different applications. In particular, the electronic device may receive one or more push events (e.g., phone calls, voicemails, e-mails, or a third-party push event) or device alerts (e.g., reminders or alarms).

Responsive to receiving a notification, the electronic device can wake up (e.g., a processor can wake up the graphics module), and the notification module can display the received notification on the display screen. In some cases, the notification can be displayed as a large-format notification. Turning now to FIGS. 8A-8F, display screens are shown of different types of notifications that can be displayed while an electronic device is operating in a locked state.

Turning first to FIG. 8A, display screen 800 is shown that can include notification 802. Notification 802 may be displayed after the electronic device receives a notification from a third-party application while operating in the locked state. In particular, notification 802 can include icon 804, which can indicate the application that generated notification 802. In addition, notification 802 can include text 806, which can provide associated text or portions of text received from the application.

In response to viewing notification 802, a user may select to go directly to the message associated with notification 802. For example, the user can access notification 802 by tapping and holding notification 802. Responsive to the user's actions, the notification module can display (e.g., by animating notification 802) a slider on the display screen (e.g., by flipping notification 802 to a backside view). For example, referring now to FIG. 8B, display screen 808 can include slider 810, which can be embedded as a component on a back side of notification 802. A user may activate slider 810 by dragging slider button 812 in a particular direction (e.g., to the right).

Once the notification module detects that slider 810 has been activated, the notification module can directly unlock the electronic device. After unlocking the device, the notification module can present to the user the particular notification in the application that generated the notification. In some cases, even if the electronic device has received multiple notifications from a particular application, the notification module can bypass other notifications, and present the particular notification that the user has specifically requested.

Figure 8D:
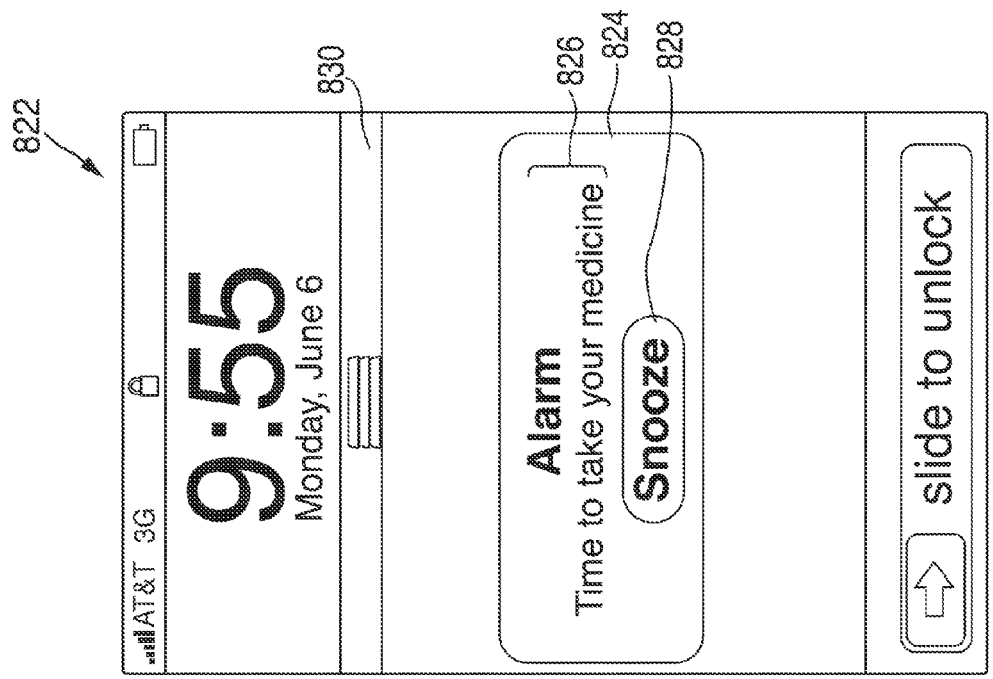
Figure 8C:
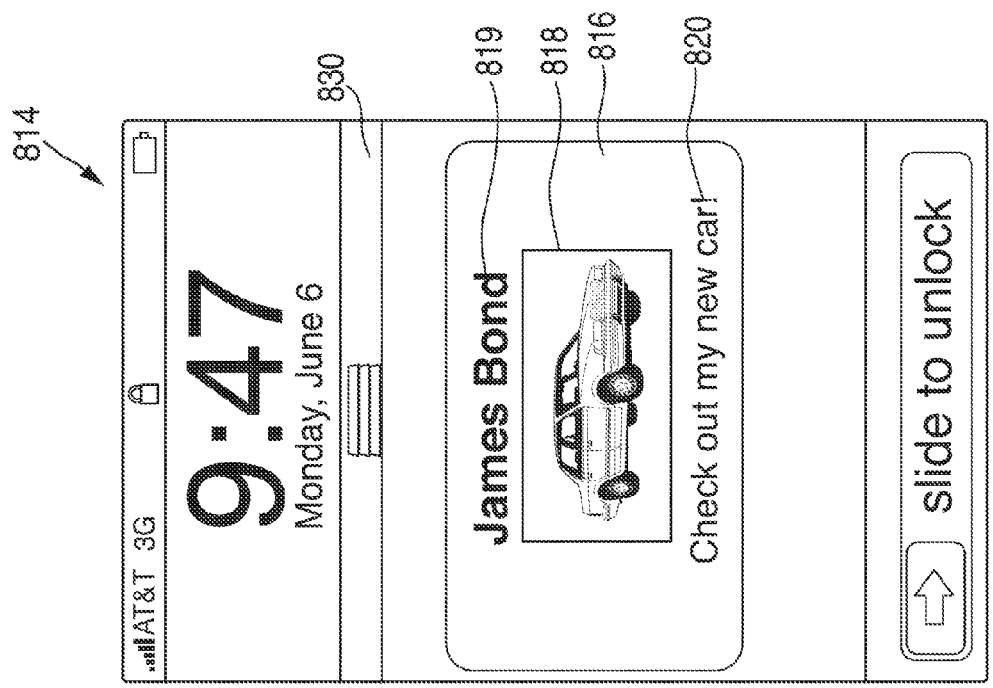

Referring now to FIG. 8C, display screen 814 is shown, which can include notification 816. Notification 816 may be displayed in response to an image text message that is received by the electronic device. In particular, notification 816 can include embedded image 818. In addition, notification 816 can include text 819, which can provide the identity of the person who sent the text message. Furthermore, notification 816 can include text 820, which can be text accompanying the image. As shown in FIG. 8C, image 818 can be prominently displayed in notification 816 (e.g., image 818 can be enlarged relative to texts 819 and 820).

Similar to FIGS. 8A and 8B, if the user selects to access notification 816 (e.g., by tapping and holding notification 816), the notification module can display a slider. If the user then activates the slider by dragging the slider, the notification module can unlock the device and provide image 818 directly to the user (e.g., display image 818 in an image view of a chat application).

Persons skilled in the art will appreciate that the notification module can display any suitable type(s) of media in a notification. For example, a notification can include one or more sound(s), electronic business card(s), video(s), and map URL(s) (e.g., the notification module can display a map of the location of the URL). In addition, similar to coalesced banners, the notification module can display information associated with multiple notifications that have been queued for a particular application in a single notification.

Moreover, notifications can be displayed in response to one or more trigger events (e.g., time-based or location-based trigger events). For example, responsive to receiving a notification that is associated with a location-based trigger event, the notification module can display a notification associated with the event once the electronic device is detected at the location of the trigger event.

As another example, when the notification module receives a notification that is associated with a time-based trigger event, the notification module can display a notification associated with the event at the start of the event or at a pre-defined time before the start of the event. For example, turning now to FIG. 8D, display screen 822 is shown with notification 824. Notification 824 can include text 826, which can indicate that notification 824 is displayed in response to a time-based trigger event (e.g., an alarm). In addition, text 826 can provide a description of the alarm.

Notification 824 can further include "SNOOZE" button 828. In response to the user selecting "SNOOZE" button 828, the notification module can stop the alarm for a pre-determined period of time. As a result of this function, the user is able to control an alarm without having to unlock the electronic device.

Display screens 800 (FIG. 8A), 808 (FIG. 8B), 814 (FIG. 8C), and 822 (FIG. 8D) can include pull-down option 830, which can be positioned above a notification that is displayed. Persons skilled in the art will appreciate that although pull-down option 830 is shown in FIGS. 8A-8D as being above a notification, pull-down option 830 can be positioned in any suitable location in a display screen (e.g., left, right, or bottom of the display screen). In addition, if the electronic device is in a sleep mode, a user may be able to view pull-down option 830 by pressing a button (e.g., an on/off and/or home button) on the electronic device.

Pull-down option 830 can allow a user to view previously received notifications (e.g., all of the notifications received while the electronic device was operating in the locked state). A user can select pull-down option 830 by dragging option 830 in a downward motion on the display screen.

Referring now to FIG. 8E, display screen 832 shows list of notifications 834, which can be a list of previously received notifications. In particular, when each notification of list of notifications 834 was first received, the notification may have been displayed as a large-format notification (e.g., as shown in FIGS. 8A-8D). However, because the user did not respond to the notification, the notification was then added to list of notifications 834 as an individual element. In some embodiments, the first displayed instance of a notification in locked mode can be larger than when the same notification is shown in list of notifications 834. For instance, notifications 802 (FIG. 8B), 816 (FIG. 8C), and 824 (FIG. 8D) can be larger than elements 835, 837, and 838, respectively. That is, elements 835, 837, and 838 can be displayed in a small format.

The individual elements of list of notifications 834 can be stacked on top of each other. For example, the notification module can display multiple text messages received by the electronic device as individual elements in list of notifications 834.

In some embodiments, list of notifications 834 can be arranged based on a time that each notification was received (e.g., based on a chronological order). That is, the most recently received notification can be appended to the top of list of notifications 834. Alternatively, the most recently received notification can be appended to the bottom of list of notifications 834. As shown in FIG. 8E, for example, list of notifications 834 is arranged in a chronological order, with the most recent notification at the top of list 834.

In other embodiments, list of notifications 834 can be arranged based on a user-selected parameter. For example, a user can specify which application's notifications should appear first, second, third, and so forth. Based on the user-selected parameter, the notification module can sort the received notifications. For example, notifications corresponding to each application can be first grouped together, and the applications can then be arranged in a pre-determined order. For instance, notifications corresponding to voicemails can be listed first, notifications corresponding to e-mails can be listed second, and notifications corresponding to text messages can be listed third, etc. A user's selection of the manner in which list of notifications 834 is arranged will be described in more detail in connection with FIG. 9B.

List of notifications 834 can be scrollable. In particular, region 836 of display screen 832 can be made scrollable, such that list of notifications 834 can move up or down when the user either swipes or drags a portion of region 830. As a result, list of notifications 834 can be capable of displaying a large number of notifications (e.g., all of the notifications that have been received while a device is operating in a locked state). In some embodiments, list of notifications can be automatically displayed regardless of whether pull-down option 830 was displayed and manipulated by a user.

In addition, each notification in list of notifications 834 can be individually accessible. For example, each notification can be associated with its own slider. Similar to the discussion above, a user may select to access a notification in list of notifications 834 by tapping and holding the notification. For example, the user can tap and hold notification 838, and responsive to the user's actions, the notification can display a slider in list of notification 834 (e.g., by flipping notification 838 to a backside view).

Turning now to FIG. 8F, display screen 840 shows listing of notifications 834 with a backside view of notification 838. In particular, notification 838 can include slider 842. Similar to slider 810 (FIG. 8B), slider 842 can be an embedded component in notification 838. A user can activate slider 842 by dragging slider button 844 in one direction (e.g., to the right of display screen 840).

Once the user actives slider 842, the notification module can detect that slider 844 has been activated, and the module can unlock the electronic device. After unlocking the device, the notification module can present the particular notification in the application that generated the notification.

In some embodiments, the user may select to unlock the device. For example, the user may select to unlock the device by pressing a button (e.g., an on/off and/or a home button) or sliding "UNLOCK" slider 846. Responsive to the user's actions, the notification module can display a notification center on the display screen (e.g., similar to notification center 602 of FIGS. 6A-6E). In other embodiments, in response to the user unlocking the device, the notification module may not display the notification center until the user specifically invokes the notification center. In some embodiments, "UNLOCK" slider 846 (or other user input unlocking region) can include context sensitive text that changes based on when a notification is received. For example, if an email is received and displayed in the list of notifications 834, the text state "slide to read." As another example, if a reminder notification is received, the text may state "slide to view."

In some cases, the notification module may allow a user to specify a privacy setting. Thus, if the user selects to turn on the privacy setting, one or more notifications or types of notifications (e.g., notifications associated with text messages) received when the electronic device is in a locked state are not displayed while the device remains in that state. Then, once the user selects to unlock the device, the notification module can display the received notifications in one or more banners (e.g., similar to banners of FIGS. 7A-7E).

As discussed previously, because users may have different preferences for how they would like notifications to be displayed, the electronic device can allow users to customize notification settings. In particular, a user may be able to customize notification settings for the locked (e.g., notifications) and unlocked states (e.g., the notification center and banners).

Referring back to FIG. 5, display screen 500 can include "SETTINGS" option 504. In particular, the user may select "SETTINGS" option 504 to change one or more settings of the electronic device. Thus, responsive to the user selecting "SETTINGS" option 504, the electronic device can provide display screens allowing the user to change system settings. For example, turning now to FIGS. 9A-9F, display screens associated with customizing notification settings are shown.

Referring first to FIG. 9A, display screen 900 is shown to include list of settings 902, which can be displayed after the user selects "SETTINGS" option 504 (FIG. 5). List of settings 902 can include "NOTIFICATIONS" option 904. A user may select "NOTIFICATIONS" option 904 to access and modify one or more notification settings (e.g., by tapping on "NOTIFICATIONS" option 904).

In response to detecting that the user has selected "NOTIFICATIONS" option 904, the electronic device can provide one or more notification settings on a display screen. These notification settings can allow a user to change one or more banner options or notification center options (e.g., when an electronic device is in an unlocked state) or one or more notification options (e.g., when an electronic device is in a locked state). For example, referring next to FIG. 9B, display screen 906 is shown, which can include multiple notification settings.

For example, display screen 906 can include manual sorting option 908 and automatic sorting option 910. Sorting options 908 and 910 are user-selected parameters that can specify the order in which notifications are displayed in one or more contexts such as, for example, in a list of notifications (e.g., list of notifications 834 of FIGS. 8E and 8F).

If a user selects sorting option 908, a notification module (e.g., notification module 238 of FIG. 2) can allow the user (e.g., provide options to the user) to manually specify the order in which notifications are displayed in a list of notifications. That is, the user can specify which application's notifications should appear first, second, and so forth. Based on the user's selection of sorting option 908, the notification module can sort the received notifications based on the user-specified order.

In some embodiments, the order in which the applications are sorted can correspond to the order in which applications are listed in the "In Notification Center" group 911. In other embodiments, the electronic device can display a different display screen (not shown) that can allow the user to specify the order in which the applications are to be sorted.

Once the notification module has sorted notifications in groups based on corresponding applications, the notification can assign a pre-determined order for each group. For example, for each group, the notification module can arrange the associated notifications based on the time of receipt of each notification (e.g., based on a chronological order). Persons skilled in the art will appreciate that any other pre-determined order can be used instead.

In contrast, if a user selects sorting option 910, the notification module can assign a pre-determined order for displaying notifications in the list of notifications. In particular, the notification module can arrange the received notifications based on the time of receipt of each notification (e.g., based on a chronological order). That is, the most recently received notification can be appended to the top (or bottom) of a list of notifications. If a newer notification is received, the top notification can be pushed down in the list of notifications.

Display screen 906 can also include options 912, which can allow a user to specify which applications to display in a notification center (e.g., notification center 602 of FIGS. 6A-6E). As shown in display screen 906, options 912 can include multiple interactive lists (e.g., "In Notification Center" group 911 and "Not in Notification Center" group 913). Notifications for applications that are included in the "In Notification Center" group 911 are displayed in the notification center. By contrast, notifications for applications that are included in the "Not in Notification Center" group 913 are excluded from the notification center.

A user may specify which applications to include in the notification center using any suitable approach. For example, the user can manually adjust options 912 by selecting "EDIT" option 914. In response to the user selecting "EDIT" option 914, the electronic device can provide a display screen that allows the user to manually move applications in and out of groups 911 and 913.

Turning now to FIG. 9C, display screen 920 can be shown in response to the user's selection of "EDIT" option 914 (FIG. 9B). As shown in display screen 920, the user can move each of the options 912 in or out of "In Notification Center" group 911 and "Not in Notification Center" group 913. For example, the user can tap and drag option 922 from the "Not in Notification Center" group 913 to the "In Notification Center" group 911.

FIG. 9D shows display screen 924, which can be displayed after option 922 has been moved to the bottom of the "In Notification Center" group 911. In some cases, the order in which the applications are arranged in the "In Notification Center" group 911 can dictate the order in which application panes will be displayed in the notification center. For instance, based on "In Notification Center" group 911 of FIG. 9D, the notification center can include a weather panel on top, followed by a mail panel, and so forth. Accordingly, the user may adjust the order in which application panes are displayed in the notification center by moving each of options 922, 926, 928, or 930 up or down (e.g., by tapping and dragging each option).

Once the user has finished editing the applications to be displayed in a notification center, the user may select "DONE" option 932. After the user's selection, the electronic device can return to a display screen similar to display screen 906 of FIG. 9B.

As another example, the user may specify which applications are to be displayed in a notification center by tapping on an option in options 912. For example, referring to FIG. 9B, the user can select "MAIL" option 916. In response to the user's selection, the electronic device can provide a detailed view of display options for the "MAIL" application.

Figure 9F:
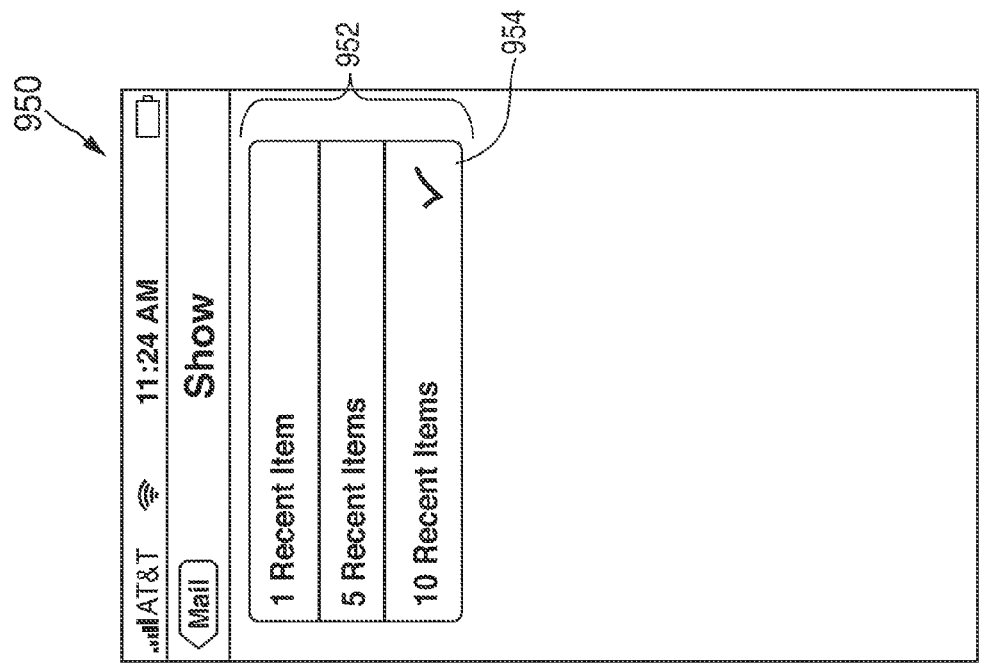
Figure 9E:
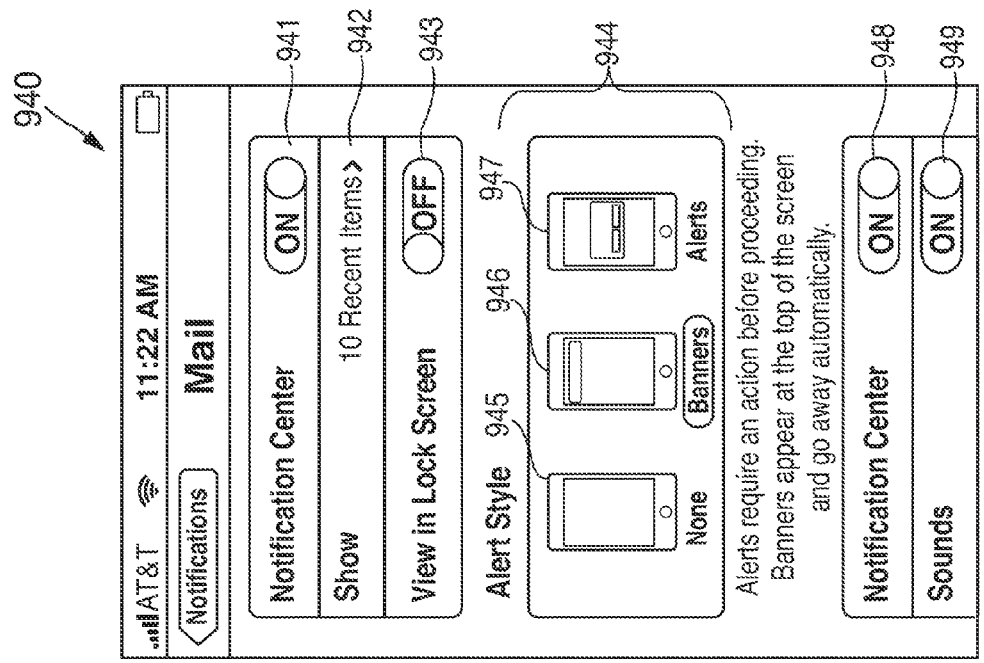

Turning now to FIG. 9E, display screen 940 can provide a detailed view of display options for the "MAIL" application. Display screen 940 can include switch 941, which can allow a user to specify whether to include notifications received from the "MAIL" application in the notification center. In particular, if the user sets switch 941 to "ON", notifications received from the "MAIL" application will be displayed in the notification center. If the user instead sets switch 941 to "OFF", notifications received from the "MAIL" application will not be displayed in the notification center.

If notifications from an application have been selected to be included in the notification center, the user may specify a pre-determined number of notifications to be displayed for that application by selecting "SHOW" option 942.

Referring now to FIG. 9F, the electronic device can provide display screen 950, which can be displayed in response to the user selecting "SHOW" option 942. Display screen 950 can include list of options 952, in which each option of the list can allow a user to specify a different number of notifications to be displayed for an application in the notification center (e.g., one, five, or ten notifications). For example, in response to the user selecting option 954, the application pane corresponding to the mail application (e.g., application pane 614 of FIG. 6B) can display a maximum of ten notifications. In some cases, based on the frequency of updates, the pre-determined number of notifications may be set to a higher number for some applications (e.g., an e-mail or social network application), and may be set to a lower number for other applications (e.g., a weather application).

Persons skilled in the art will appreciate that options provided in list of options 952 are merely illustrative. In particular, the electronic device can alternatively provide one or more options that allow the user to specify any pre-determined number of notifications (e.g., one, five, ten, twenty or more items, and so on).

Based on the pre-determined number of notifications, a notification module can automatically clear out notifications from an application pane when the number of notifications that can be displayed exceeds the pre-determined number (e.g., as shown in FIGS. 6C and 6D). Because the notification module can automatically remove one or more notifications that exceed the pre-determined number of notifications, the notification module is able to provide a concise presentation of notifications in the notification center. Moreover, this approach is convenient for users because users do not have to clear notifications out of the notification center (by, for example, selecting button 616 of FIG. 6B).

Referring back to FIG. 9E, display screen 940 can further include option 943, which can allow a user to select whether to display notifications associated with the application while an electronic device is operating in the locked state (e.g., in the display screens of FIGS. 8A-8F). In some embodiments, user can opt-in to option 943. That is, option 943 can have a default state of "OFF", such that notifications that are received while the device is in the locked state are not displayed until the device is switched to the unlocked state. This setting can be advantageous because it allows a user to customize the display of notifications based on privacy concerns. For example, the user may not want new e-mail messages to appear on the display screen while the device is operating in the locked state. Once the user unlocks the device, however, the user may want to be able to see the received e-mail messages by invoking the notification center or through one or more banners. If, however, the user selects to set option 943 to "ON", the notification module can immediately display new notifications received while the device is in the locked state.

Options 944 can allow a user to specify how notifications are to be displayed while an electronic device is operating in an unlocked state. For example, options 944 can include "NONE" option 945, "BANNERS" option 946, and "ALERTS" option 947.

In response to the user selecting "NONE" option 945, the notification module can suppress visual notifications for a particular application. However, the notifications can still be displayed in a notification center. Alternatively, in response to the user selecting "BANNERS" option 946, the notification module can display received notifications as one or more banners on the display screen (e.g., banners shown in FIGS. 7A-7E). The user may, for example, select "BANNERS" option 946 if a particular application transmits important but frequently generated notifications.

In response to the user selecting "ALERTS" option 947, the notification module can display received notifications as messages that require a user's response (e.g., the user is required to select a "DISMISS" option or a "VIEW" option depending on the type of application).

Display screen 940 can also include "BADGE APP ICON" option 948, which can indicate whether to display a picture of the application in a banner corresponding to a notification that is received. For example, if "BADGE APP ICON" option 948 is set to "ON", the notification module can display an icon representing the application that generated the notification (e.g., icon 704 of FIG. 7A). If "BADGE APP ICON" option 948 is instead set to "OFF", the notification module will not display icons in the banners corresponding to the application. Persons skilled in the art will appreciate that in addition to or instead of a picture of the application, "BADGE APP ICON" can enable the notification module to add any other visual embellishments to a banner.

"SOUNDS" option 949 can indicate whether to enable sounds upon receipt of a notification for the application. If "SOUNDS" option 949 is set to "OFF", no sounds will be played when a notification is received for the application. If "SOUNDS" option 949 is instead set to "ON", the notification can play audio alerts when a new notification of the application is received. As a result, even if "NONE" option 945 is selected for a particular application (e.g., there are no visual notifications), the user may still hear audio alerts when new notifications are received for that application. As a result of hearing the audio alerts, a user may later choose to invoke the notification center in order to access the notifications. Persons skilled in the art will appreciate that the notification settings discussed in FIGS. 9A-9F are merely illustrative, and that any other suitable notification settings can be made customizable.

As discussed previously, a notification module can be implemented on any suitable electronic device. For example, the notification module can be implemented on an electronic device with a large display and/or touch screen (e.g., touch I/O device 212 of FIG. 2). In such embodiments, the notification center may not fill the entire screen as it does on a smaller device.

Figure 10A:
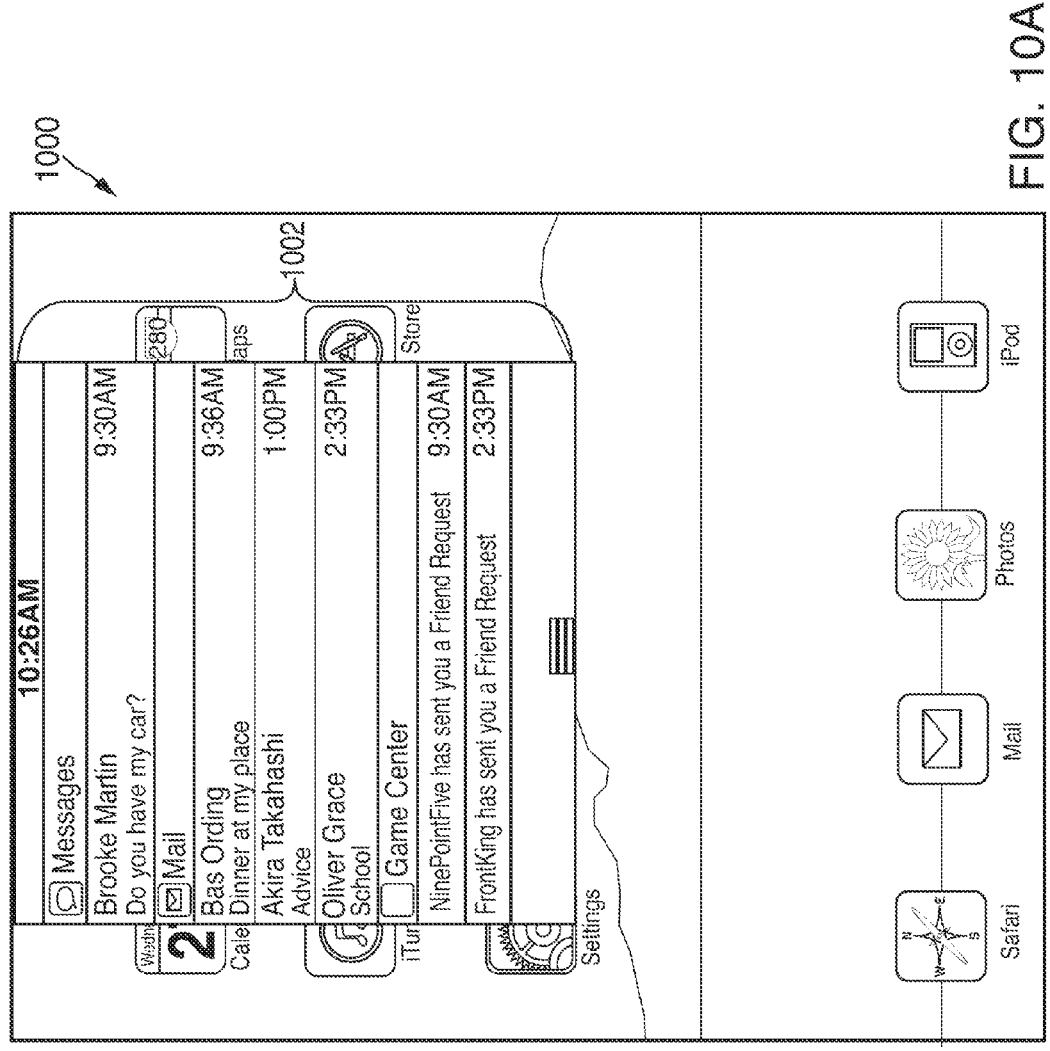
FIGS. 10A-10C are display screens associated with notifications in accordance with various embodiments of the invention.
Figure 10B:
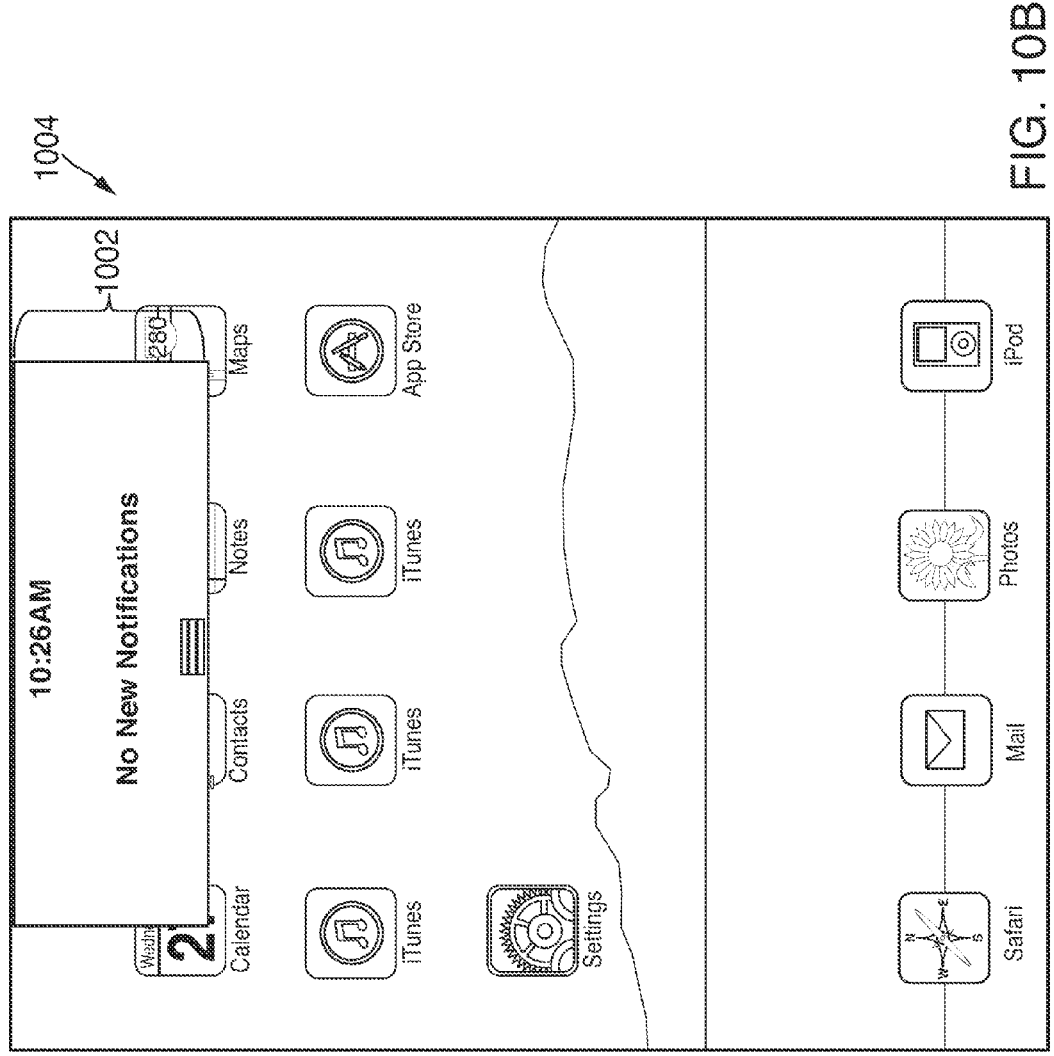
Figure 10C:
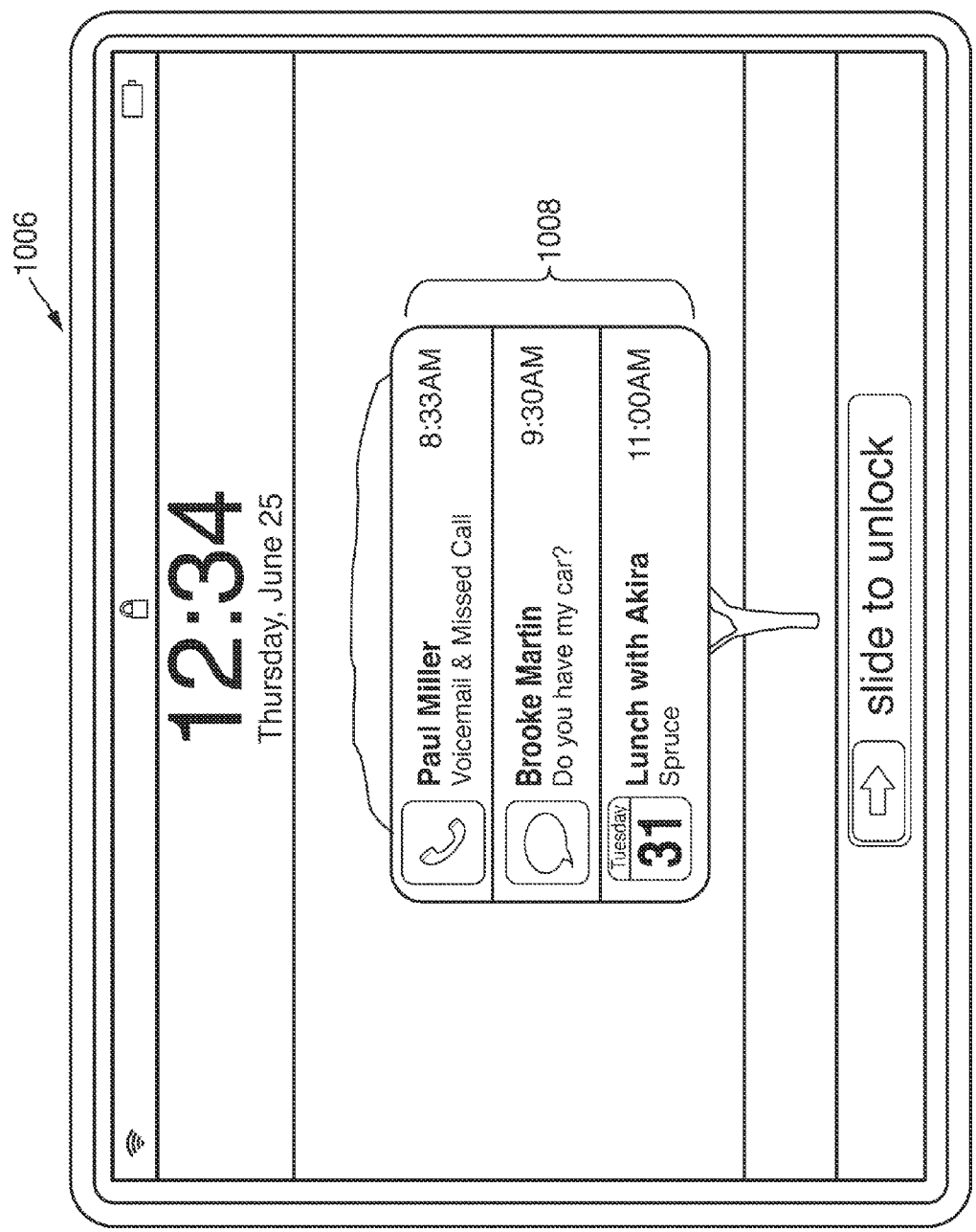

For instance, turning now to FIGS. 10A-10C, display screens are shown for an electronic device with a large display. Referring first to FIG. 10A, display screen 1000 shows that notification center 1002 does not fill the entirety of display screen 1000.

Furthermore, for a device with a large display, the notification module may display a visual indication when the notification center does not include any new notifications. For example, as shown in display screen 1004 of FIG. 10B, the notification module can indicate that notification center 1002 currently contains no new notifications. Persons skilled in the art will appreciate that such an indication can also be provided on an electronic device with a smaller display.

Referring now to FIG. 10C, display screen 1006 shows the type of notifications that may be displayed when an electronic device with a large screen is in both a locked state and a landscape mode. Thus, in contrast to FIGS. 8A-8F, new notifications that are received are not first displayed as large individual notifications on the display screen. Rather, the new notifications are displayed in scrollable list of notifications 1008. Consequently, there may be no need for the notification module to display a pull-down option such as pull-down option 830 of FIGS. 8A-8D. Persons skilled in the art will appreciate that list of notifications 1008 can be displayed in a similar manner when the device is in a portrait mode.

Persons skilled in the art will also appreciate that each of the notifications in list of notifications 1008 can exhibit similar characteristics as the notifications in list of notifications 834 (FIGS. 8E and 8F). In addition, persons skilled in the art will appreciate that the display screens shown in FIGS. 10A-10C are merely one embodiment of the notification center. Thus, a notification module implemented on an electronic device with a large display can display notifications in any suitable manner (e.g., similar to the manner in which notifications are provided in FIGS. 6A-6E, FIGS. 7A-7E, FIGS. 8A-8F, and FIGS. 9A-9F).

Turning now to FIGS. 11-14, flowcharts of illustrative processes are shown in accordance with various embodiments of the invention. These processes may be executed by one or more components of an electronic device (e.g., device 100 of FIG. 1 or system 200 of FIG. 2). For example, at least some of the steps in the processes of FIGS. 11-14 may be performed by a notification module (e.g., notification module 238 of FIG. 2). In addition, persons skilled in the art will appreciate that some of the steps may be performed in conjunction with a touch processing module (e.g., touch processing module 226 of FIG. 2) and/or a graphics module (e.g., graphics module 228 of FIG. 2).

Figure 11:
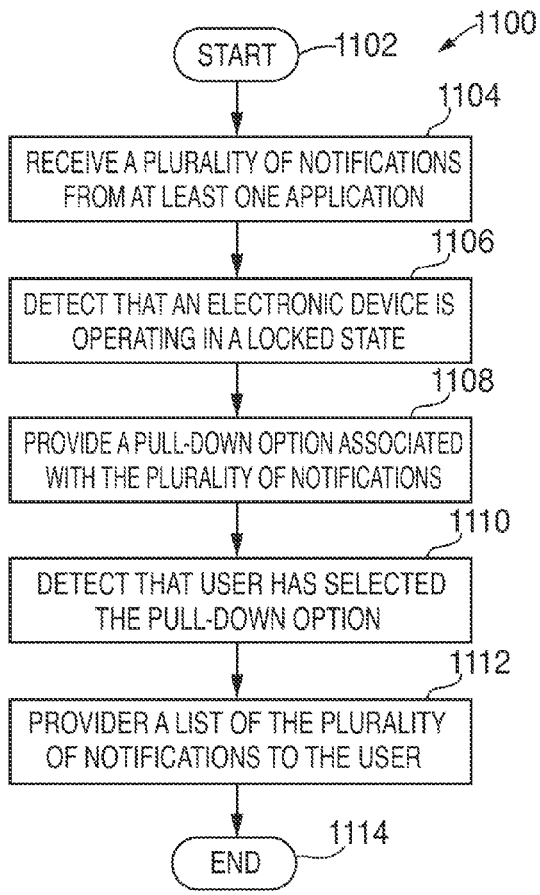
FIG. 11 is a flowchart of an illustrative process for displaying a pull-down option in response to receiving multiple notifications in accordance with various embodiments of the invention.

Turning first to FIG. 11, process 1100 is shown for displaying a pull-down option in response to receiving multiple notifications. Process 1100 may begin at step 1102, and, at step 1104, the notification module can receive a plurality of notifications from at least one application.

Then, at step 1106, the notification module can detect that the electronic device is operating in a locked state. Continuing to step 1108, the notification module can provide a pull-down option (e.g., pull-down option 830 of FIGS. 8A-8D) associated with the plurality of notifications. In addition, the notification module can also provide a notification on a display screen (e.g., notification 802 of FIGS. 8A and 8B, notification 816 of FIG. 8C, or notification 824 of FIG. 8D), where the displayed notification can be the one that was most recently received.

After providing the pull-down option, process 1100 may move to step 1110. At step 1110, the notification module can determine that a user has selected the pull-down option. Then, at step 1112, the notification module can provide a list of the plurality of notifications to the user (e.g., list of notifications 834 of FIGS. 8E and 8F). Process 1100 may then end at step 1114.

Figure 12:
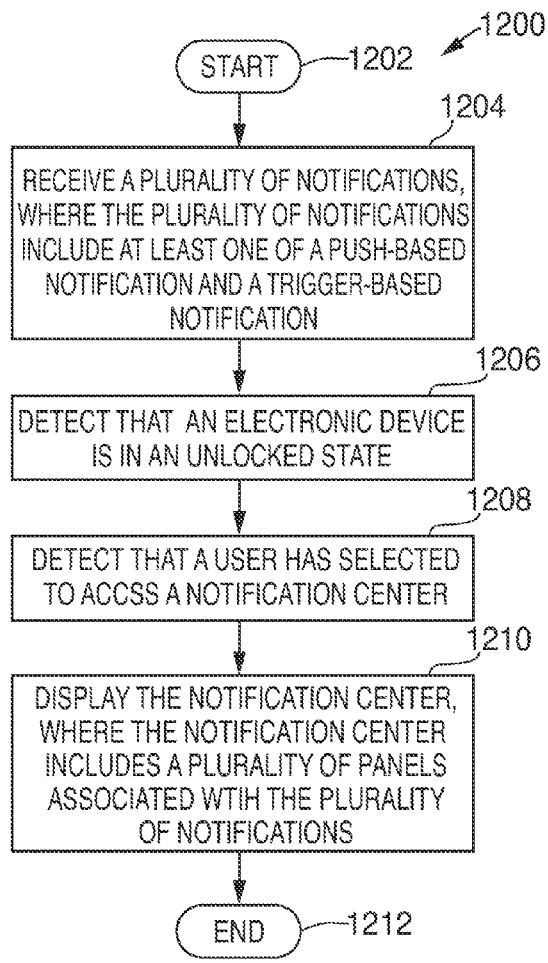
FIG. 12 is a flowchart of an illustrative process for displaying a notification center in accordance with various embodiments of the invention.

Turning now to FIG. 12, process 1200 is shown for displaying a notification center. Process 1200 may begin at step 1202, and, at step 1204, the notification module can receive a plurality of notifications, where the plurality of notifications can include at least one of a push-based notification (e.g., a notification from a non-third party or third party application) and a trigger-based notification (e.g., an alarm or a reminder).

Then, at step 1206, the notification module can detect that an electronic device is in an unlocked state. After detecting that the device is in the unlocked state, process 1200 may move to step 1208.

At step 1208, the notification module can detect that a user has selected to access a notification center. For example, the notification module can detect that the user has performed a gross swipe gesture (e.g., by quickly flicking one or more fingers in a downward motion from the top of a display screen). As another example, the notification module can detect that the user has slowly dragged one or more fingers downwards from the top of display screen.

Continuing to step 1210, the notification module can display the notification center, where the notification center can include a plurality of panes associated with the plurality of notifications (e.g., panes 608-614 of FIG. 6B). Process 1200 may then end at step 1212.

Referring now to FIG. 13, a flowchart of illustrative process 1300 is shown for providing a banner. Process 1300 may begin at step 1302, and, at step 1304, the notification module can receive a notification from at least one application. At step 1306, the notification module can detect that an electronic device is in an unlocked state.

Figure 7E:
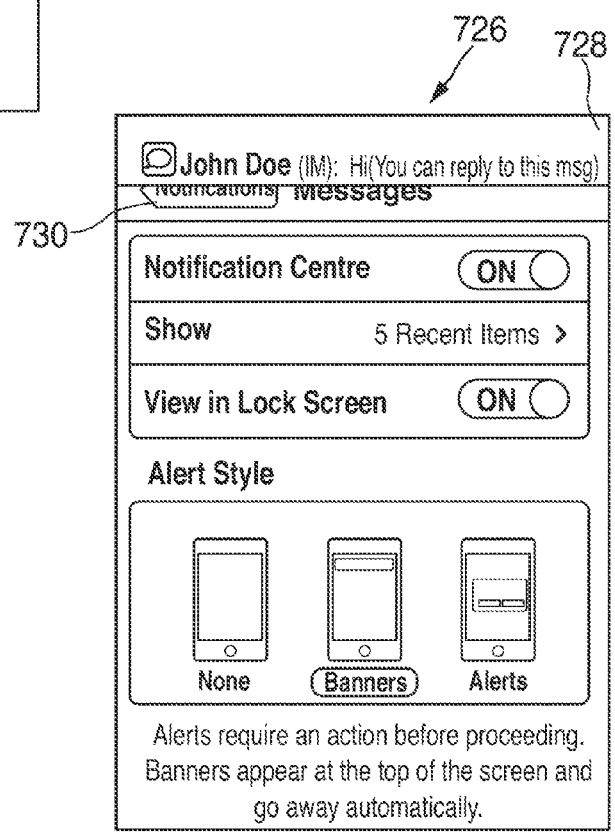

Continuing to step 1308, the notification module can provide a banner associated with the notification, where the banner allows a user to access at least one control overlapping with the banner. For example, as shown in FIG. 7E, the notification module can provide banner 728 that overlaps with "NOTIFICATIONS" button 730. However, the notification module can nonetheless allow a user to access "NOTIFICATIONS" button 730. After providing the banner, process 1300 may end at step 1310.

Referring now to FIG. 14, a flowchart of illustrative process 1400 is shown for providing notification settings. Process 1400 may begin at step 1402, and, at step 1404, the notification module can provide an option to modify settings for device notifications (e.g., "NOTIFICATIONS" option 904 of FIG. 9A). Then, at step 1406, the notification module can detect that a user has selected the option.

Continuing to step 1408, the notification module can provide a plurality of notification settings, where the plurality of notification settings can include options associated with one or more of an order of notifications option (e.g., options 912 of FIG. 9B), a number of notifications option (e.g., list of options 952 of FIG. 9F), and alert style options (e.g., alert style options 944 of FIG. 9E). Process 1400 may then end at step 1410.

It should be understood that processes 1100, 1200, 1300, and 1400 of FIGS. 11-14 are merely illustrative. Any of the steps may be removed, modified, or combined, and any additional steps may be added, without departing from the scope of the invention.

The described embodiments of the invention are presented for the purpose of illustration and not of limitation.

What is claimed is:

1. A method comprising:
    at an electronic device with a touch-sensitive display:
        receiving a plurality of notifications;
        detecting that the electronic device is in an unlocked state;
        detecting that a user has selected to access a notification center;
        in response to detecting that the user has selected to access the notification center, displaying the notification center, wherein displaying the notification center comprises displaying:
            a first pane including:
                a first region including one or more first notifications of the plurality of notifications; and
                a first header separate from the first region, the first header including a first pane descriptor and a first option for clearing the one or more first notifications in the first region; and
            a second pane including:
                a second region including two or more second notifications of the plurality of notifications; and
                a second header separate from the second region, the second header including a second pane descriptor and a second option for clearing the two or more second notifications in the second region;
        while displaying the notification center, detecting a sequence of one or more inputs at a respective location in the notification center; and
        in response to detecting the sequence of one or more inputs at the respective location in the notification center:
            in accordance with a determination that the respective location at which the sequence of one or more inputs is detected corresponds to the first option, clearing the first pane, including the one or more first notifications in the first region and the first header, without clearing the two or more second notifications in the second region; and
            in accordance with a determination that the respective location at which the sequence of one or more inputs is detected corresponds to the second option, clearing the second pane, including the two or more second notifications in the second region and the second header, without clearing the one or more first notifications in the first region.

2. The method of claim 1, wherein detecting that the user has selected to access the notification center comprises detecting that the user has performed a gesture from a top of the display towards a bottom of the display.

3. The method of claim 1, wherein displaying the notification center comprises pulling down the notification center from a top of the display to a bottom.

4. The method of claim 1, comprising providing an option to modify settings for the notification center; detecting that the user has selected the option; and providing a plurality of notification settings.

5. The method of claim 1, comprising providing for automatic removal of at least one notification from the notification center after a calendar event corresponding to the at least one notification has lapsed.

6. The method of claim 1, comprising detecting user selection of one of the displayed panes; and opening an application associated with the user selected pane.

7. The method of claim 1, wherein the plurality of notifications comprise at least one of a push-based notification and a trigger-based notification, wherein the trigger-based notification is a time-based notification or a location-based notification.

8. The method of claim 1, wherein:
the one or more first notifications of the plurality of notifications are notifications for a first application; and
the two or more second notifications of the plurality of notifications are notifications for a second application different than the first application.

9. The method of claim 1, wherein detecting the sequence of one or more inputs at the respective location in the notification center includes detecting a first input at the respective location and a second input at the respective location.

10. A non-transitory computer readable medium storing one or more programs, the one or more programs comprising instructions, which when executed by an electronic device with a touch-sensitive display, cause the device to:
receive a plurality of notifications;
detect that the electronic device is in an unlocked state;
detect that a user has selected to access a notification center;
in response to detecting that the user has selected to access the notification center, display the notification center, wherein displaying the notification center comprises displaying:
a first pane including:
a first region including one or more first notifications of the plurality of notifications; and
a first header separate from the first region, the first header including a first pane descriptor and a first option for clearing the one or more first notifications in the first region; and
a second pane including:
a second region including two or more second notifications of the plurality of notifications; and
a second header separate from the second region, the second header including a second pane descriptor and a second option for clearing the two or more second notifications in the second region;
while displaying the notification center, detect a sequence of one or more inputs at a respective location in the notification center; and
in response to detecting the sequence of one or more inputs at the respective location in the notification center:
in accordance with a determination that the respective location at which the sequence of one or more inputs is detected corresponds to the first option, clear the first pane, including the one or more first notifications in the first region and the first header, without clearing the two or more second notifications in the second region; and
in accordance with a determination that the respective location at which the sequence of one or more inputs is detected corresponds to the second option, clear the second pane, including the two or more second notifications in the second region and the second header, without clearing the one or more first notifications in the first region.

11. The non-transitory computer readable medium of claim 10, wherein detecting that the user has selected to access the notification center comprises detecting that the user has performed a gesture from a top of the display towards a bottom of the display.

12. The non-transitory computer readable medium of claim 10, wherein displaying the notification center comprises pulling down the notification center from a top of the display to a bottom.

13. The non-transitory computer readable medium of claim 10, comprising instructions which cause the device to: provide an option to modify settings for the notification center; detect that the user has selected the option; and provide a plurality of notification settings.

14. The non-transitory computer readable medium of claim 10, comprising instructions which cause the device to: provide for automatic removal of at least one notification from the notification center after a calendar event corresponding to the at least one notification has lapsed.

15. The non-transitory computer readable medium of claim 10, comprising instructions which cause the device to: detect user selection of one of the displayed panes; and open an application associated with the user selected pane.

16. The non-transitory computer readable medium of claim 10, wherein the plurality of notifications comprise at least one of a push-based notification and a trigger-based notification, wherein the trigger-based notification is a time-based notification or a location-based notification.

17. The non-transitory computer readable medium of claim 10, wherein:
the one or more first notifications of the plurality of notifications are notifications for a first application; and
the two or more second notifications of the plurality of notifications are notifications for a second application different than the first application.

18. The non-transitory computer readable medium of claim 10, wherein detecting the sequence of one or more inputs at the respective location in the notification center includes detecting a first input at the respective location and a second input at the respective location.

19. An electronic device, comprising:
a display;
a touch-sensitive surface;
one or more processors;
memory; and
one or more programs, wherein the one or more programs are stored in the memory and configured to be executed by the one or more processors, the one or more programs including instructions for:
receiving a plurality of notifications;
detecting that the electronic device is in an unlocked state;
detecting that a user has selected to access a notification center;
in response to detecting that the user has selected to access the notification center, displaying the notification center, wherein displaying the notification center comprises displaying:

a first pane including:
  a first region including one or more first notifications of the plurality of notifications; and
  a first header separate from the first region, the first header including a first pane descriptor and a first option for clearing the one or more first notifications in the first region; and
a second pane including:
  a second region including two or more second notifications of the plurality of notifications; and
  a second header separate from the second region, the second header including a second pane descriptor and a second option for clearing the two or more second notifications in the second region;
while displaying the notification center, detecting a sequence of one or more inputs at a respective location in the notification center; and
in response to detecting the sequence of one or more inputs at the respective location in the notification center:
  in accordance with a determination that the respective location at which the sequence of one or more inputs is detected corresponds to the first option, clearing the first pane, including the one or more first notifications in the first region and the first header, without clearing the two or more second notifications in the second region; and
  in accordance with a determination that the respective location at which the sequence of one or more inputs is detected corresponds to the second option, clearing the second pane, including the two or more second notifications in the second region and the second header, without clearing the one or more first notifications in the first region.

20. The electronic device of claim 19, wherein detecting that the user has selected to access the notification center comprises detecting that the user has performed a gesture from a top of the display towards a bottom of the display.

21. The electronic device of claim 19, wherein displaying the notification center comprises pulling down the notification center from a top of the display to a bottom.

22. The electronic device of claim 19, comprising providing an option to modify settings for the notification center; detecting that the user has selected the option; and providing a plurality of notification settings.

23. The electronic device of claim 19, comprising providing for automatic removal of at least one notification from the notification center after a calendar event corresponding to the at least one notification has lapsed.

24. The electronic device of claim 19, comprising detecting user selection of one of the displayed panes; and opening an application associated with the user selected pane.

25. The electronic device of claim 19, wherein the plurality of notifications comprise at least one of a push-based notification and a trigger-based notification, wherein the trigger-based notification is a time-based notification or a location-based notification.

26. The electronic device of claim 19, wherein:
  the one or more first notifications of the plurality of notifications are notifications for a first application; and
  the two or more second notifications of the plurality of notifications are notifications for a second application different than the first application.

27. The electronic device of claim 19, wherein detecting the sequence of one or more inputs at the respective location in the notification center includes detecting a first input at the respective location and a second input at the respective location.

* * * * *